(12) United States Patent
Yasohara et al.

(10) Patent No.: US 8,169,170 B2
(45) Date of Patent: May 1, 2012

(54) MOTOR DRIVING DEVICE, MOTOR DEVICE, AND INTEGRATED CIRCUIT DEVICE

(75) Inventors: Masahiro Yasohara, Hyogo (JP); Kenji Sugiura, Osaka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 12/664,287

(22) PCT Filed: Apr. 3, 2008

(86) PCT No.: PCT/JP2008/000859
§ 371 (c)(1),
(2), (4) Date: Dec. 11, 2009

(87) PCT Pub. No.: WO2008/152761
PCT Pub. Date: Dec. 18, 2008

(65) Prior Publication Data
US 2010/0171453 A1 Jul. 8, 2010

(30) Foreign Application Priority Data
Jun. 14, 2007 (JP) .................. 2007-157221

(51) Int. Cl.
*H02P 31/00* (2006.01)
(52) U.S. Cl. ....................... 318/383; 318/269
(58) Field of Classification Search .............. 318/700, 318/400.01, 400.09, 400.21, 400.26, 268, 318/269, 376, 383
See application file for complete search history.

(56) References Cited

U.S. PATENT DOCUMENTS

| | | | | |
|---|---|---|---|---|
| 4,326,154 A | * | 4/1982 | Lewis et al. | 318/376 |
| 5,440,219 A | * | 8/1995 | Wilkerson | 318/802 |
| 5,801,498 A | * | 9/1998 | Kusano et al. | 318/139 |
| 7,931,128 B2 | * | 4/2011 | Sakai et al. | 187/293 |

FOREIGN PATENT DOCUMENTS

| | | |
|---|---|---|
| JP | 06-233585 A | 8/1994 |
| JP | 06-245565 A | 9/1994 |
| JP | 2003-047274 A | 2/2003 |
| JP | 2003-348874 A | 12/2003 |
| JP | 2004-282838 A | 10/2004 |
| JP | 2007-137311 A | 6/2007 |
| JP | 2007-215282 A | 8/2007 |

OTHER PUBLICATIONS

International Search Report for International Application No. PCT/JP2008/000859, dated Jul. 1, 2008, 1 page.

* cited by examiner

*Primary Examiner* — Bentsu Ro
(74) *Attorney, Agent, or Firm* — Brinks Hoffer Gilson & Lione

(57) ABSTRACT

A motor driving device (100) includes an inverter (20), a speed control unit (40), and a regeneration preventing means (50). The inverter (20) converts supplied DC power to driving power for driving a motor (10), and supplies the driving power to the motor (10). The speed control unit (40) generates a speed control signal group based on a speed command signal Sref and a speed detection signal N, and adjusts the driving power based on a drive control signal VSP1 included in the speed control signal group, thereby controlling the speed of the motor (10). The regeneration preventing means (50) determines whether the motor (10) is in a state possibly causing regenerative phenomena or in a state not causing regenerative phenomena based on the speed command information included in the speed command signal Sref and the speed detection information included in the speed detection signal N, and performs a regeneration reduction process to reduce regenerative phenomena according to the determination result, thereby preventing regenerative phenomena.

17 Claims, 13 Drawing Sheets

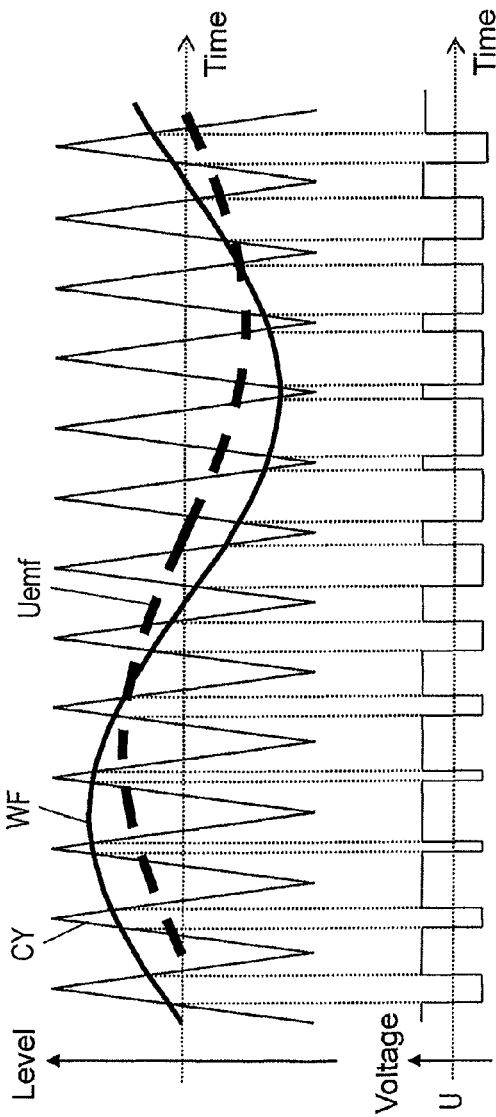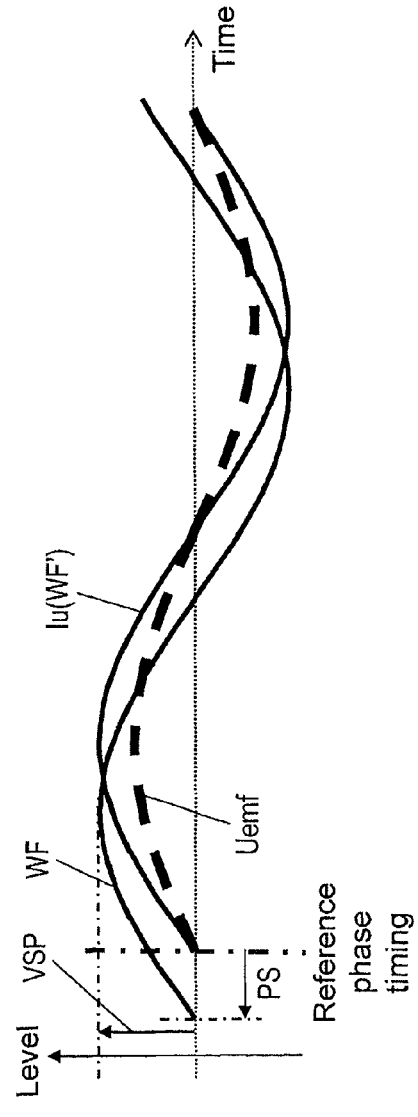
FIG. 3
FIG. 4 ated within pulse-width modulation unit 832. Pulse width
MOTOR DRIVING DEVICE, MOTOR DEVICE, AND INTEGRATED CIRCUIT DEVICE

TECHNICAL FIELD

The present invention relates to a motor driving device suitable for driving, for example, a brushless DC motor used in air conditioners, water heaters with a combustion fan motor, air cleaners, information devices such as copying machines and printers, and other similar devices. The present invention relates, more particularly, to a motor driving device capable of reducing regenerative phenomena when the motor is sine- wave driven, allowing the motor to be driven with substantially low levels of torque ripple, vibration, and noise. The present invention also relates to an integrated circuit device including such a motor driving device, and a motor device in which such a motor driving device or an integrated circuit device is built-in or integrated with a motor.

BACKGROUND ART

Most driving motors used in electrical devices such as air conditioners, water heaters, air cleaners, copying machines, and printers are brushless DC motors because they have advantages such as long life, high reliability, and ease of speed control.

When a speed-controllable motor running at a constant speed is decelerated, the motor begins to act as an electric generator. More specifically, the so-called regenerative phenomenon occurs where the motor supplies power to the power supply or the drive circuit, which are supposed to supply power to the motor.

FIG. 10 is a configuration diagram including a conventional motor driving device for driving a brushless DC motor as described above. FIG. 11 is a diagram showing the operation of this motor driving device. FIG. 12 is a diagram showing the regenerative phenomenon observed in the motor driving device. FIG. 13 is a diagram showing a voltage increase in a DC power supply caused by the regenerative phenomenon in the motor driving device.

The following is a description, with reference to drawings, of the structure and operation of the conventional motor driving device for driving a brushless DC motor using sinusoidally pulse-width-modulated drive signals, and of a regenerative phenomenon observed in the conventional technique.

FIG. 10 shows motor driving device 800, which is supplied with DC power from DC power supply 805. Motor driving device 800 converts the DC power to driving power, and supplies the driving power to motor 810, which is a brushless DC motor. Motor driving device 800 receives a speed command signal Sref and a switching signal HL as command information from host device 806, and also receives a position detection signal CS and a speed detection signal N from motor 810.

Motor 810 includes U-phase drive winding 811, V-phase drive winding 813, and W-phase drive winding 815, which are supplied with the driving power from motor driving device 800.

Motor driving device 800 includes inverter 820, inverter drive unit 830, and speed control unit 840. Speed control unit 840 generates a drive control signal VSP for controlling the speed of motor 810 based on the command information and the speed detection signal N, and sends it to inverter drive unit 830. Inverter drive unit 830 generates drive signals for drive-controlling inverter 820 based on the drive control signal VSP, and then drives inverter 820. Inverter 820 converts the supplied DC power into driving voltages according to the position detection signal CS and the drive control signal VSP, and supplies the driving voltages to motor 810.

Inverter 820 includes positive-electrode-side switch elements 821, 823, and 825 for connecting drive windings 811, 813, and 815 of motor 810 to a positive-electrode-side power supply line Vp and negative-electrode-side switch elements 822, 824, and 826 for connecting these drive windings to a negative-electrode-side power supply line Vn.

Inverter drive unit 830 includes waveform generation unit 831 and pulse-width modulation unit 832. Waveform generation unit 831 generates a sinusoidal waveform signal WF according to the position detection signal CS received from motor 810. Pulse width modulation unit 832 generates drive signals UH, VH, WH, UL, VL, and WL, which have been subjected to pulse width modulation (hereinafter sometimes referred to as "PWM") according to the waveform signal WF.

The drive signals UH, VH, and WH have a phase difference of an electrical angle of 120 degrees from each other, and the drive signals UL, VL, and WL also have a phase difference of an electrical angle of 120 degrees from each other. These drive signals are connected to the switch elements (hereinafter sometimes referred to simply as "switches") of inverter 820 so as to turn them on and off as shown in FIG. 10.

The following is a description of the operation of the motor driving device for driving the above-described conventional brushless DC motor. The following description will be focused on the action associated with U-phase drive winding (hereinafter sometimes referred to simply as "winding") 811, which is connected to the output U of inverter 820.

First, host device 806 sends the speed command signal Sref and the switching signal HL as the command information to speed control unit 840. Host device 806 is composed of a microcomputer, a DSP, or the like. The speed command signal Sref is a signal for commanding the speed of motor 810. The switching signal HL is a control signal for changing the control gain according to the speed setting of motor 810 indicated by the speed command signal Sref.

In order to control motor 810 to drive at the speed indicated by the speed command signal Sref, speed control unit 840 adjusts the drive control signal VSP so as to equalize the speed command signal Sref with the speed detection signal N received from motor 810. Waveform generation unit 831 generates a sinusoidal waveform signal WF whose amplitude corresponds to the drive control signal VSP.

FIG. 11 shows the sinusoidal waveform signal WF thus generated by waveform generation unit 831, and a triangular waveform signal CY, which is a PWM carrier signal generated within pulse-width modulation unit 832. Pulse width modulation unit 832 compares the waveform signal WF with the carrier signal CY. Switches 821 and 822 of inverter 820 are tuned on and off complementarily according to the comparison result. This allows the driving voltage U shown in FIG. 11 to be outputted from inverter 820 and applied to drive winding 811. As a result, drive winding 811 is supplied with a U-phase drive current Iu and generates an induced voltage Uemf. From the instantaneous viewpoint, the driving voltage U is a pulse-like voltage alternately changing between the positive-electrode-side voltage and the negative-electrode-side voltage of DC power supply 805. When the mean value is calculated based on the pulse width modulation principle, on the other hand, the driving voltage U is a sinusoidal voltage corresponding to the waveform signal WF. As a result, drive winding 811 is supplied with the same sinusoidal voltage as in the U-phase waveform signal WF. The term "complementarily" means that while one switch is in the ON state, the other is in the OFF state, and while the one switch is in the OFF state, the other is in the ON state.

FIG. 11 also shows the detailed timings at which the positive-electrode-side switches and the negative-electrode-side switches are turned on and off complementarily. The drive signal UH turns on and off switch 821, and the drive signal UL turns on and off switch 822. Switch 821 is in the ON and OFF states when the drive signal UH is at the levels H and L, respectively. Switch 822 is in the ON and OFF states when the drive signal UL is at the levels H and L, respectively. Specifically, when the ON and OFF states of these switches are changed over, there is provided a brief moment, like a time "td" shown in FIG. 11. The time "td" is called a dead time or an on delay, during which period both switches are in the OFF state. This period is provided as a well-known technique to prevent a short circuit of DC power supply 805.

V-phase drive winding 813 and W-phase drive winding 815 are supplied with sinusoidal voltages as a driving voltage V and a driving voltage W, respectively, from inverter 820 in the same manner as U-phase drive winding 811, while keeping the phase difference of an electrical angle of 120 degrees between the U-, V-, and W-phases.

Thus, the sinusoidal voltages having an amplitude (peak value) corresponding to the drive control signal VSP are applied to drive windings 811, 813, and 815 different in phase from each other. As a result, motor 810 is sine-wave driven while the driving power to the windings is adjusted to control the speed.

The following is a description of the regenerative phenomenon occurring in motor driving device 800.

In FIG. 12, the waveform signal WF corresponds to the driving voltage U outputted from inverter 820. The waveform signal WF shows the operation of motor 810 when the mean value of the driving voltage U (corresponding to the waveform signal WF) becomes smaller than the induced voltage Uemf generated in drive winding 811. The driving voltage can become smaller than the induced voltage when the peak value of the waveform signal WF is reduced, for example, in order to decelerate the motor.

First, in a period "a" of FIG. 12, switch 821 is in the ON state, and switch 822 is in the OFF state. As a result, drive winding 811 is connected to the positive-electrode-side power supply line Vp of DC power supply 805, and the instantaneous value of the driving voltage U becomes the voltage of the positive-electrode-side power supply line Vp. In the period "a", the driving voltage U is higher than the induced voltage Uemf, thus increasing the current Iu of drive winding 811. The increment depends on the voltage (shown in the area hatched in the period "a") obtained by subtracting the induced voltage Uemf from the driving voltage U. When the mean value of the driving voltage U is smaller than the induced voltage Uemf, however, the difference is small, and the current increase is also small.

Next, in a period "b", switch 821 is in the OFF state, and switch 822 is in the ON state. As a result, drive winding 811 is connected to the negative-electrode-side power supply line Vn of DC power supply 805, and the instantaneous value of the driving voltage U becomes the voltage of the negative-electrode-side power supply line Vn. In the period "b", the driving voltage U is lower than the induced voltage Uemf, thus decreasing the current Iu of drive winding 811. The decrement depends on the voltage (shown in the area hatched in the period "b") obtained by subtracting the driving voltage U from the induced voltage Uemf. When the mean value of the driving voltage U is smaller than the induced voltage Uemf, the difference is large, and the current decrease is also large.

In a period "b1" of the period "b", the current Iu reaches drive winding 811 after flowing through switch 822 or the diode connected antiparallel thereto, and then continues to decrease. In a period "b2" before which the current Iu decreases to zero, the direction of the current is inverted. As a result, the current Iu begins to flow to the negative-electrode-side power supply line Vn from drive winding 811 via switch 822. The current Iu at this moment is supplied from the induced voltage Uemf, which is opposite to the direction in which the current for driving the motor is supposed to flow.

In a period "c", switch 821 is in the ON state, and switch 822 is in the OFF state as in the period "a". As a result, the current Iu increases as in the period "a", but the increment is too small to reverse the current direction so as to return to the original direction. In the period "c", the current Iu flows to the positive-electrode-side power supply line Vp from drive winding 811 via switch 821 or the diode connected antiparallel thereto. The current Iu is supplied from the induced voltage Uemf, which is opposite to the direction in which the current for driving the motor is supposed to flow as in the period "b2".

Next, in a period "d", switch 821 is in the OFF state and switch 822 is in the ON state as in the period "b". As a result, the current Iu continues to greatly decrease as in the period "b". In the period "d", the current Iu flows to the negative-electrode-side power supply line Vn from drive winding 811 via switch 822. As a result, a larger current Iu than in the period "b2" is supplied from the induced voltage Uemf.

Driving the motor requires supplying the current Iu to the induced voltage Uemf of drive winding 811. However, as described above, there occurs a phenomenon that the current Iu is, on the contrary, supplied from the induced voltage Uemf. When this phenomenon continues, every time switch 821 is turned on and switch 822 is turned off, the current Iu flows to the positive-electrode-side power supply line Vp from drive winding 811 via switch 821 or the diode connected antiparallel thereto. This phenomenon occurs also in windings 813 and 815, and the currents flown from these windings flow to the positive-electrode-side electrode of DC power supply 805 via the positive-electrode-side power supply line Vp.

This results in the so-called regeneration where the motor acts as an electric generator and supplies power to the DC power supply, which is supposed to supply power to the motor.

FIG. 13 is a diagram showing an increase in an output voltage VDC of DC power supply 805 caused by the above-described regenerative phenomenon.

When the speed command signal Sref is decreased as shown by the broken line in FIG. 13, that is, a deceleration command is issued, the motor is decelerated. At this moment, speed control unit 840 decreases the drive control signal VSP according to the difference between the speed command signal Sref and the speed detection signal N. The decrease in the drive control signal VSP results in a decrease in the output voltage of inverter 820, that is, the driving voltage of each of drive windings 811, 813, and 815. The driving voltages applied to these windings are lower than the induced voltages generated in the windings. When the driving voltages applied to the windings are thus lower than the induced voltages, the above-described regenerative phenomenon occurs, thereby increasing the output voltage VDC of DC power supply 805. The comparative size between the driving voltage applied to a winding and the induced voltage corresponds to the comparative size between the drive control signal VSP and the speed detection signal N shown in FIG. 13.

As described hereinbefore, motors including brushless DC motors generally cause such regenerative phenomena. Therefore, there has been proposed to return the power generated by a regenerative phenomenon to the power supply side for its effective use or to protect the drive circuit or the power supply circuit from overvoltage due to the regenerative phenomena (see, for example, Patent Literature 1).

FIG. 14 is a configuration diagram of a conventional regeneration control device. This device returns a regeneration current caused by a regenerative phenomenon to the power supply circuit, and reduces the increase in the DC circuit voltage due to the regenerative phenomenon during the period which is switched to the power-supply regeneration. The conventional regeneration control device thus protects the inverter device from DC circuit overvoltage during regeneration.

In FIG. 14, thyristor converter 92 acts as a converter during power running so as to convert the AC voltage of AC power supply 91 to a DC voltage, and also acts as an inverter during regeneration operation. Capacitor 93 is connected in parallel on the DC side of thyristor converter 92. Inverter circuit 94 converts the DC power received from thyristor converter 92 to AC power so as to variable-speed-control induction motor 95. Speed control circuit 914 calculates a current command Iref for nullifying the deviation between a motor speed Nfbk detected by speed detector 98 and a speed command Nref. Control means 920 controls the output voltage and frequency of inverter circuit 94 based on the current command Iref.

When induction motor 95 is decelerated and switched from power running to regeneration, regeneration determiner 912 determines the occurrence of a switch-over based on the speed command Nref and the current command Iref. Current-change-rate limiting circuit 921 is provided between speed control circuit 914 and control means 920. Current-change-rate limiting circuit 921 reduces the time change rate of the current command Iref only during the period while thyristor converter 92 is switched to regeneration conversion according to the determination output of regeneration determiner 912.

In the conventional regeneration control device thus structured, when decelerated by reducing the speed command Nref, induction motor 95 is switched from operating as a motor to operating as an electric generator. In other words, the energy of the mechanical system is transferred to capacitor 93 through inverter circuit 94 and regenerated as electrical energy. Therefore, this conventional regeneration control device first pays attention to the time change rate of the absolute value of the speed command Nref. Regeneration determiner 912 determines whether the time change rate is negative, or on the increase after the current command Iref, which is the output of speed control circuit 914 is switched from power running to regeneration. Then, delay circuit 913 reduces the rate of increase in the current command by reducing the change rate of the regeneration current of current-change-rate limiting circuit 921 during the time until thyristor converter 92 has been switched from a converter to an inverter and starts regeneration. In this manner, the conventional regeneration control device reduces the charging current of capacitor 93, and hence, the increase in the charge voltage. When thyristor converter 92 has been switched to regeneration, the DC circuit voltage is reduced to a predetermined value by voltage control circuit 931.

Thus, the conventional regeneration control device provides a means to project the inverter device from DC circuit overvoltage during regeneration instead of providing a regenerative discharge resistor for consuming regenerative energy or increasing the capacitor capacity for storing regenerative energy.

The conventional regeneration control device allows efficient use of electric power by returning electric power generated by a regenerative phenomenon to the power supply side. On the other hand, however, the device has problems that the motor is inconvenient to use and that a larger number of peripheral circuits are required, thus leading to a cost increase. For example, the regeneration control device requires a circuit component for regeneration operation such as the thyristor converter capable of being switched between a converter and an inverter, or a power supply capable of absorbing regenerative power. Therefore, in terms of convenience and cost, it is desirable for a host device including a motor such as an air conditioner or a copying machine desires to have a motor device which can be operated only by connecting the motor to a power supply device capable of supplying a rated voltage and current without the need to consider regeneration.

Patent Literature 1: Japanese Patent Unexamined Publication No. 2007-215282

SUMMARY OF THE INVENTION

The motor driving device according to the present invention has the following structure.

The motor driving device according to the present invention for driving a motor including a speed detector to detect a speed of a moving element of the motor and for outputting the speed as speed detection information, the motor driving device comprising: an inverter for converting supplied DC power to driving power to drive the motor, and for supplying the driving power to the motor; a speed control unit for generating a speed control signal group based on command information received externally and the speed detection information received from the speed detector, and for adjusting the driving power based on a drive control signal included in the speed control signal group, thereby controlling the speed of the motor; and a regeneration preventing means for determining whether the motor is in a state possibly causing regenerative phenomena or in a state not causing regenerative phenomena based on the command information and the speed detection information, and for performing a regeneration reduction process to reduce the regenerative phenomena according to the determination result, thereby preventing the regenerative phenomena.

With this structure, the period during which the motor is in a state possibly causing regenerative phenomena can be determined based on the control state of the motor, and the regenerative phenomena are kept reduced during this period, thereby preventing the occurrence of regenerative power returning to the motor driving device or the power supply device. In other words, the returning of the regenerative energy from the motor to the motor driving device or the power supply device is reduced, thereby preventing the occurrence of an overvoltage, which is due to, for example a sudden increase in the DC circuit voltage. This eliminates the need to provide in the vicinity of the motor a circuit for detecting a voltage increase due to regenerative phenomena, a circuit for detecting a voltage increase, a circuit for returning regenerative power to the power supply device, or a power supply device for absorbing regenerative power. As a result, the motor driving device has high reliability and high convenience.

In the motor driving device, the regeneration preventing means includes: a regeneration occurrence determination unit for determining whether the motor is in a state possibly causing regenerative phenomena or in a state not causing regenerative phenomena based on the command information and the speed detection information; and a regeneration reducing means for performing the regeneration reduction process according to the determination result of the regeneration occurrence determination unit, wherein the regeneration reducing means starts the regeneration reduction process when the regeneration occurrence determination unit determines that the motor is in a state possibly causing regenerative phenomena, and releases the regeneration reduction process when the regeneration occurrence determination unit determines that the motor is in a state not causing regenerative phenomena.

With this structure, the period after the motor enters a state possibly causing regenerative phenomena until the motor enters a state not causing regenerative phenomena is determined based on the control state of the motor. This allows the accurate determination of the period during which the motor is in a state possibly causing regenerative phenomena, so that regenerative phenomena can be kept reduced during this period, thereby preventing the returning of regenerative power to the motor driving device or the power supply device.

The motor device according to the present invention includes: a motor; a speed detector for detecting the speed of a moving element of the motor; the motor driving device according to the present invention; a power input terminal for receiving DC power; and a command information input terminal for receiving command information.

The integrated circuit device according to the present invention includes the motor driving device according to the present invention.

BRIEF DESCRIPTION OF THE DRAWINGS

FIG. 3 is a diagram showing the operation of the motor device.

FIG. 4 is a diagram showing the operation of the motor device when a phase advance signal controls the phase of a sinusoidal voltage applied to a drive winding.

REFERENCE MARKS IN THE DRAWINGS

Figure 1:
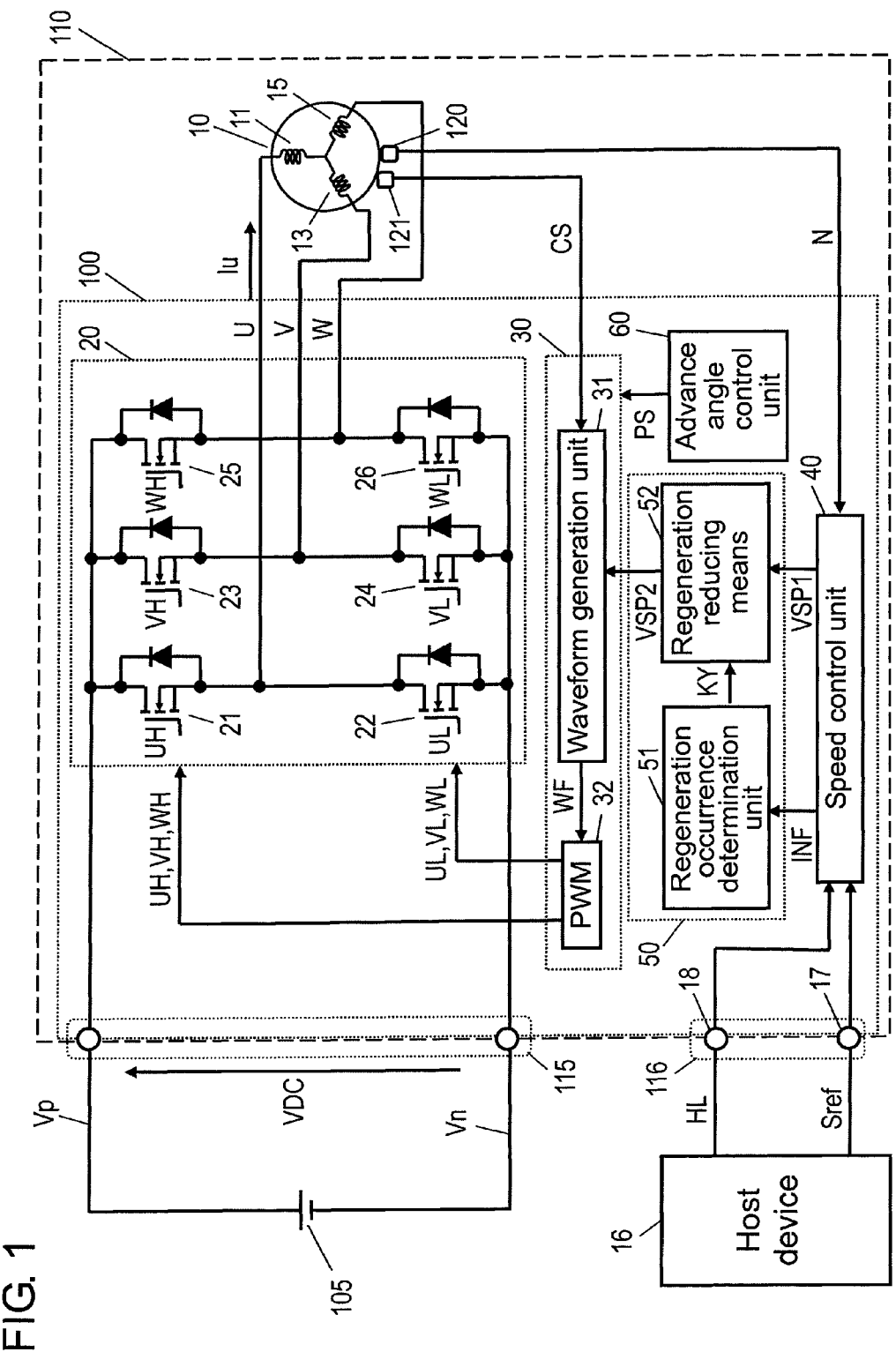
FIG. 1 is a configuration diagram showing a motor device including a motor driving device according to a first exemplary embodiment of the present invention.

10, 810 motor
11, 811 U-phase drive winding
13, 813 V-phase drive winding
15, 815 W-phase drive winding
16, 806 host device
17, 18 input terminal
20, 820 inverter
21, 22, 23, 24, 25, 26, 821, 822, 823, 824, 825, 826 switch element
30, 830 inverter drive unit
31, 831 waveform generation unit
32, 232, 832 pulse-width modulation unit
40, 840 speed control unit
50, 250 regeneration preventing means
51 regeneration occurrence determination unit
52 regeneration reducing means
60 advance angle control unit
91 AC power supply
92 thyristor converter
93 capacitor
94 inverter circuit
95 induction motor
98 speed detector
100, 800 motor driving device
105, 805 DC power supply
110 motor device
115 power input terminal
116 command information input terminal
120 speed detector
121 position detector
511 deceleration detection unit
512 overshoot detection unit
513 gain change detection unit
514 speed attainment detection unit
519 determination unit
912 regeneration determiner
913 delay circuit
914 speed control circuit
920 control means
921 current-change-rate limiting circuit
931 voltage control circuit

DETAILED DESCRIPTION OF PREFERRED EMBODIMENTS

Exemplary embodiments of the present invention will be described as follows with reference to drawings.
First Exemplary Embodiment FIG. 1 is a configuration diagram showing motor device 110 including motor driving device 100 according to a first exemplary embodiment of the present invention.

As shown in FIG. 1, motor device 110 includes motor 10, speed detector 120 for detecting the speed of a moving element of motor 10, position detector 121 for detecting the position of the moving element, motor driving device 100 for driving motor 10, power input terminal 115 for receiving DC power from external DC power supply 105, and command information input terminal 116 for receiving command information from external host device 16.

Host device 16, which can be provided in a device having motor device 110, is composed of a microcomputer, a DSP, or the like. Host device 16 sends command information for commanding and controlling the speed of motor device 110 to motor device 110. In the present exemplary embodiment, as the command information, a speed command signal Sref and a switching signal HL are inputted to input terminals 17 and 18, respectively, of motor device 110. The speed command signal Sref represents speed command information, which commands the speed of motor 10. The switching signal HL represents gain change command information, which commands changing the control gain according to the speed setting of motor 10 indicated by the speed command signal Sref.

Speed detector 120 as a means for detecting the speed of the moving element of motor 10 can be realized, for example, using a circuit having a simple electric generation function called "frequency generator". Position detector 121 as a means for detecting the position of the moving element of motor 10 can be realized, for example, using a Hall sensor utilizing the Hall effect or using an induced voltage generated in the drive winding or a drive winding current. Position detector 121 outputs to motor driving device 100 a position detection signal CS representing position detection information, which is information related to the detected position of the moving element. Speed detector 120 outputs to motor driving device 100 a speed detection signal N representing speed detection information, which is information related to the detected speed of the moving element.

Motor 10 includes the moving element (not shown), U-phase drive winding 11, V-phase drive winding 13, and W-phase drive winding 15. One end of each of these drive winding is connected to motor driving device 100 so as to be supplied with driving voltages U, V, and W, respectively, therefrom, and the other end of each of these drive windings is connected to each other at the neutral point of motor 10.

In motor device 110 of the present exemplary embodiment thus structured, motor 10 is a brushless DC motor which is sine-wave driven by motor driving device 100. Part or all of the functions of motor driving device 100 are realized by a single or more integrated circuits, and circuit elements for realizing the functions of motor driving device 100 are mounted on a printed circuit board, which is either built-in or integrated with motor 10.

As will be described in detail later, motor driving device 100 of the present exemplary embodiment is characterized by the ability to prevent regenerative phenomena, thereby reducing the regenerative energy returned to DC power supply 105. This allows motor device 110 to be operated just by being connected to DC power supply 105 as shown in FIG. 1 without the need to provide circuit elements for preventing regenerative power on the power-supply side of motor device 110 or to consider the regenerative power to be returned to DC power supply 105.

The following is a description of the structure of motor driving device 100 of the present exemplary embodiment.

As shown in FIG. 1, motor driving device 100 includes inverter 20 for converting DC power to AC power, speed control unit 40 for controlling the speed of motor 10, regeneration preventing means 50 for preventing regenerative phenomena, inverter drive unit 30 for driving inverter 20, and advance angle control unit 60 for controlling the phase of a waveform signal WF, which is generated by inverter drive unit 30.

Inverter 20 converts the DC power supplied from DC power supply 105 to the driving power for driving motor 10, and supplies the driving power to motor 10.

Speed control unit 40 generates a speed control signal group for speed control, including a first drive control signal VSP1 based on the command information from host device 16 and the speed detection signal N from speed detector 120. The first drive control signal VSP1 (hereinafter referred to simply as "drive control signal VSP1") is a signal for adjusting the driving power to be supplied to motor 10. Speed control unit 40 then sends the drive control signal VSP1 and a control information group INF including the command information and the speed detection signal N to regeneration preventing means 50. Speed control unit 40 then adjusts the driving power based on the drive control signal VSP1 included in the speed control signal group so as to control the speed of the motor.

Regeneration preventing means 50 determines whether motor 10 is in a state possibly causing regenerative phenomena or in a state not causing regenerative phenomena based on the control information group INF including the command information and the speed detection signal N. Regeneration preventing means 50 then performs a regeneration reduction process to reduce regenerative phenomena according to the determination result.

Regeneration preventing means 50 includes regeneration occurrence determination unit 51 for determining whether motor 10 is in a state possibly causing regenerative phenomena or in a state not causing regenerative phenomena based on the command information and the speed detection signal N, and regeneration reducing means 52 for performing the regeneration reduction process according to the determination result of regeneration occurrence determination unit 51. Regeneration reducing means 52 starts the regeneration reduction process when regeneration occurrence determination unit 51 determines that motor 10 is in a state possibly causing regenerative phenomena, and releases the regeneration reduction process when regeneration occurrence determination unit 51 determines that motor 10 has entered a state not causing regenerative phenomena.

In the present exemplary embodiment, the regeneration reduction process performed by regeneration reducing means 52 reduces the time change rate of the drive control signal VSP1. More specifically, the drive control signal VSP1 from the speed control unit 40 is subjected to the regeneration reduction process by regeneration reducing means 52 according to the determination result of regeneration occurrence determination unit 51. As a result, a drive control signal obtained from the regeneration reduction process is sent as a second drive control signal VSP2 (hereinafter referred to simply as "drive control signal VSP2") to inverter drive unit 30.

Advance angle control unit 60 generates a phase advance signal PS for controlling the phase of the waveform signal WF generated by inverter drive unit 30 and sends the phase advance signal PS to inverter drive unit 30.

Inverter drive unit 30 generates drive signals to drive-control inverter 20 based on the drive control signal VSP2 from regeneration reducing means 52, the phase advance signal PS from the advance angle control unit 60, and the position detection signal CS from position detector 121, and outputs the drive signals to inverter 20.

In this manner, inverter 20 converts the supplied DC power into driving voltages according to the drive control signal VSP2, the position detection signal CS, and the phase advance signal PS, and supplies the driving voltages to motor 10. In particular, inverter 20 converts the DC power into the driving voltages according to the drive control signal VSP2, which is the signal obtained from the regeneration reduction process according to the control state of motor 10. This results in a reduction in the regenerative energy to be returned to DC power supply 105.

The following is a detailed description of the components of motor driving device 100.

Speed control unit 40 compares the speed command signal Sref from host device 16 and the speed detection signal N from speed detector 120, multiplies the difference by a predetermined control gain, and then outputs the obtained signal as the drive control signal VSP1. The control gain is changed according to the switching signal HL sent from host device 16 via input terminal 18, and set in speed control unit 40. Setting the control gain properly in this manner achieves a stable speed control of motor 10. By making changeable, the control gain can be set suitable for either high-speed or low-speed operation of motor 10. More specifically, when the switching signal HL is set to levels H and L, motor 10 is controlled in a comparatively high-speed range and in a comparatively low-speed range, respectively. Host device 16 sets the level of the switching signal HL according to which of the speed range the speed command signal Sref corresponds to, thereby achieving the stable speed control of motor 10.

Inverter drive unit 30 includes waveform generation unit 31 and pulse-width modulation unit (PWM) 32. Waveform generation unit 31 generates the sinusoidal waveform signal WF according to the position detection signal CS, the phase advance signal PS, and the drive control signal VSP2. Pulse width modulation unit (PWM) 32 generates drive signals UH, VH, WH, UL, VL, and WL, which are obtained by pulse width modulation according to the waveform signal WF.

Figure 11:
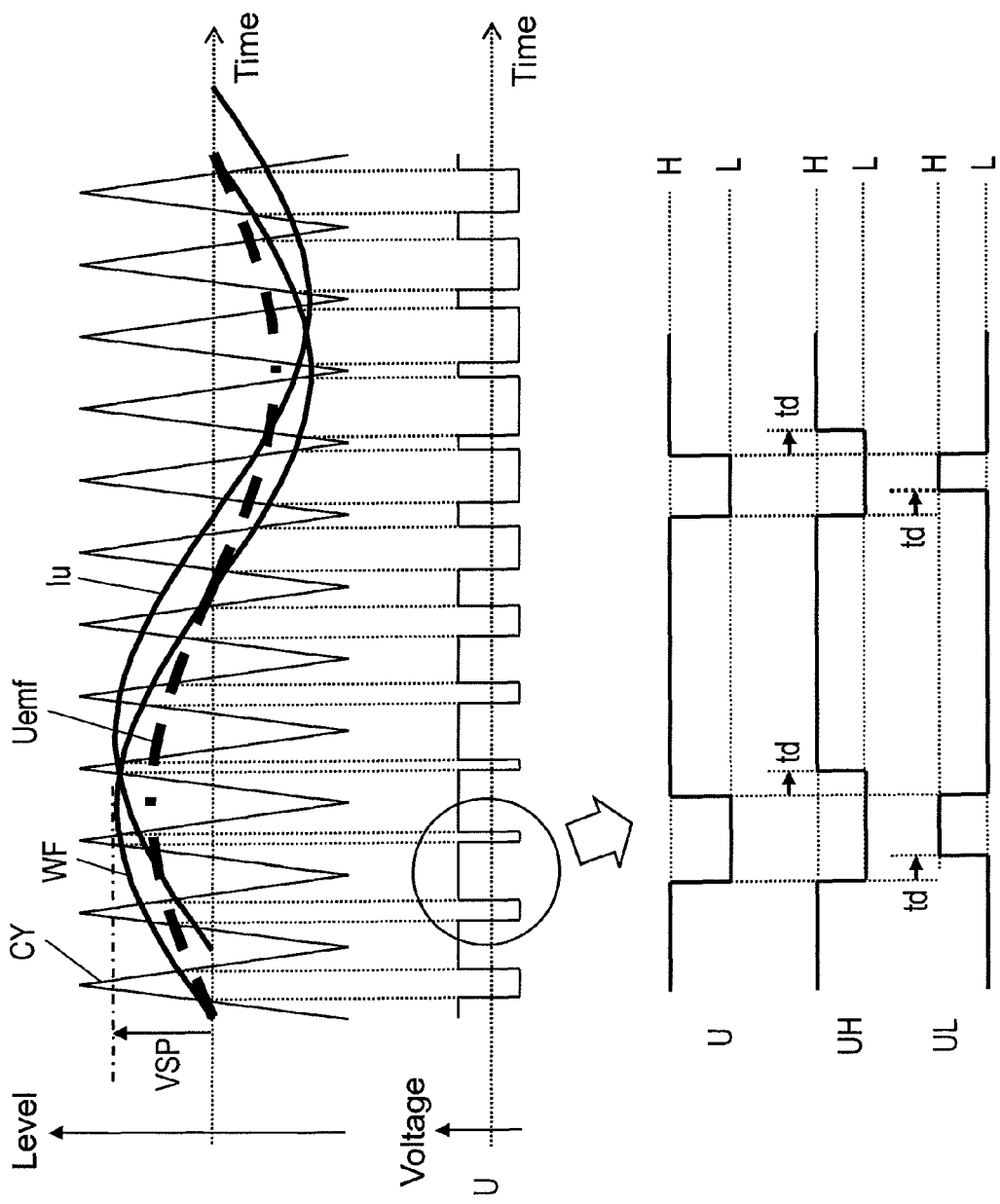
FIG. 11 is a diagram showing the operation of the motor driving device.

The drive signals UH, VH, and WH have a phase difference of an electrical angle of 120 degrees from each other, and the drive signals UL, VL, and WL also have a phase difference of an electrical angle of 120 degrees from each other. The drive signals UH and UL are substantially complementary to each other as shown in FIG. 11, and the same relation holds true between the drive signals VH and VL, and between the drive signals WH and WL. These drive signals are connected to the corresponding switch elements of inverter 20 so as to turn them on and off.

The phase of the sinusoidal waveform signal WF generated by waveform generation unit 31 is set as a phase which is ahead of the phase indicated by the phase advance signal PS with reference to the timing of detecting the position indicated by the position detection signal CS. The amplitude of the waveform signal WF is set to have a peak value corresponding to the drive control signal VSP2. Thus, waveform generation unit 31 generates the waveform signal WF whose amplitude corresponds to the difference between the speed command signal Sref and the speed detection signal N.

Pulse width modulation unit 32 generates therein a PWM carrier signal having a triangular waveform, and pulse-width modulates the waveform signal WF by comparing it with the PWM carrier signal. Pulse width modulation unit 32 then supplies the drive signals UH, VH, WH, UL, VL, and WL thus generated to inverter 20.

Inverter 20 includes positive-electrode-side switch elements 21, 23, and 25 whose one end is electrically connected to a positive-electrode-side power supply line Vp of DC power supply 105, and negative-electrode-side switch elements 22, 24, and 26 whose one end is electrically connected to a negative-electrode-side power supply line Vn. Switch elements 21 and 22 are connected to each other at the other end thereof, and their connection portion outputs a driving voltage U for driving U-phase drive winding 11. Switch elements 23 and 24, and switch elements 25 and 26 are connected in the same manner as switch elements 21 and 22 so as to output a driving voltage V for driving V-phase drive winding 13 and a driving voltage W for driving W-phase drive winding 15, respectively. Positive-electrode-side switch elements 21, 23, and 25 are turned on and off under the control of drive signals UH, VH, and WH, respectively. Negative-electrode-side switch elements 22, 24, and 26 are turned on and off under the control of drive signals UL, VL, and WL, respectively. With this structure, inverter 20 provides drive windings 11, 13, and 15 with the pulse-like driving voltages U, V, and W, respectively, which alternately change between the positive-electrode-side voltage and the negative-electrode-side voltage according to the drive signals.

The drive signals are obtained by pulse width modulation according to the waveform signal WF. Therefore, when the mean value is calculated based on the pulse width modulation principle, the driving voltages U, V, and W to be supplied to drive windings 11, 13, and 15, respectively, are sinusoidal voltages according to the waveform signal WF.

Figure 2:
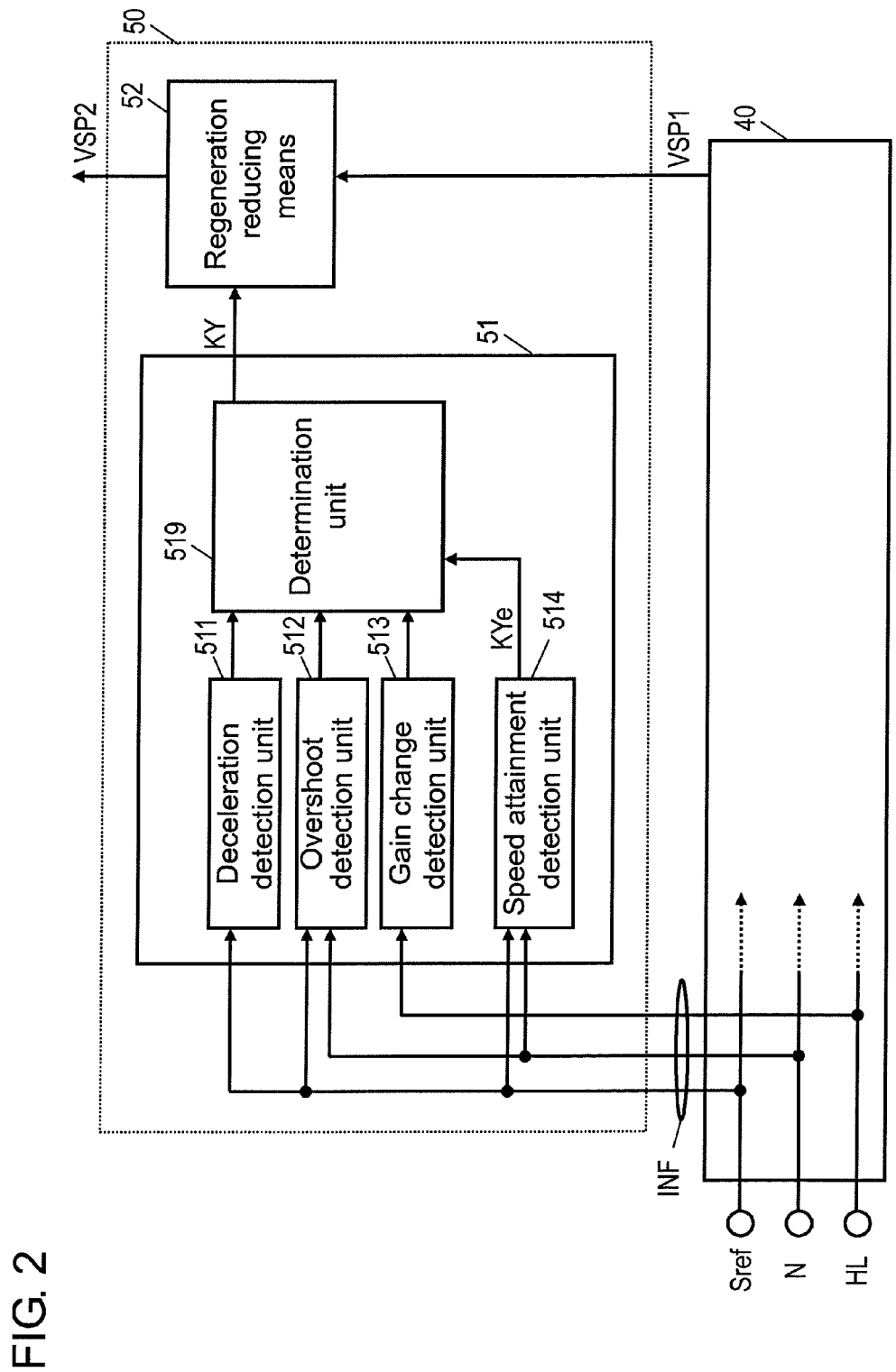
FIG. 2 is a configuration diagram showing details of a regeneration preventing means of the motor device.

Regeneration preventing means 50 includes regeneration occurrence determination unit 51 and regeneration reducing means 52 as described above. The detailed structure of regeneration preventing means 50 will be described as follows with reference to FIG. 2, which is a configuration diagram showing details of regeneration preventing means 50 of motor device 110 of the present exemplary embodiment. As shown in FIG. 2, regeneration preventing means 50 receives the control information group INF from speed control unit 40. More specifically, regeneration occurrence determination unit 51 receives the control information group INF including the speed command signal Sref, the switching signal HL, and the speed detection signal N.

Regeneration occurrence determination unit 51 includes deceleration detection unit 511, overshoot detection unit 512, gain change detection unit 513, and determination unit 519 in order to determine that motor 10 is in a state possibly causing regenerative phenomena. Regeneration occurrence determination unit 51 further includes speed attainment detection unit 514 in order to determine that motor 10 has entered a state not causing regenerative phenomena.

Deceleration detection unit 511 detects a deceleration command from the speed command signal Sref, that is, a command to change from a high-speed to low-speed operation, and then outputs first information indicating the detection of the deceleration command.

Overshoot detection unit 512 detects, from the speed command signal Sref and the speed detection signal N, an overshoot, which means that the speed indicated by the speed detection signal N is higher than the speed indicated by the speed command signal Sref. Upon detecting the overshoot, overshoot detection unit 512 outputs second information indicating the detection of an overshoot.

Gain change detection unit 513 detects a control gain change command from the switching signal HL, and outputs third information indicating the detection of the control gain change command.

Determination unit 519 generates and outputs an occurrence determination signal KY indicating whether or not motor 10 is in a state possibly causing regenerative phenomena. When the detection is presented by at least one of the first, second, and third information, determination unit 519 outputs to regeneration reducing means 52 the occurrence determination signal KY indicating that motor 10 is in a state possibly causing regenerative phenomena.

Speed attainment detection unit 514 detects, from the speed command signal Sref and the speed detection signal N, that the speed indicated by the speed detection signal N has attained the speed indicated by the speed command signal Sref. Upon detecting the speed attainment, speed attainment detection unit 514 generates fourth information indicating the detection of the speed attainment. Speed attainment detection unit 514 further determines based on the fourth information whether or not motor 10 has entered a state not causing regenerative phenomena. When determining that motor 10 has entered a state not causing regenerative phenomena, speed attainment detection unit 514 outputs a determination release signal KYe to determination unit 519. The determination release signal KYe releases the occurrence determination signal KY indicating that motor 10 is in a state possibly causing regenerative phenomena.

In this manner, determination unit 519 outputs to regeneration reducing means 52 the occurrence determination signal KY indicating the period during which motor 10 is in a state possibly causing regenerative phenomena.

In the following description of the present exemplary embodiment, as shown in FIG. 2, regeneration occurrence determination unit 51 has deceleration detection unit 511, overshoot detection unit 512, and gain change detection unit 513 because having all these units is preferable in order to determine that motor 10 is in a state possibly causing regenerative phenomena. Alternatively, however, regeneration occurrence determination unit 51 may include at least one of deceleration detection unit 511, overshoot detection unit 512, and gain change detection unit 513. More specifically, regeneration occurrence determination unit 51 may be composed, for example, of deceleration detection unit 511 only, a combination of deceleration detection unit 511 and overshoot detection unit 512, or a combination of deceleration detection unit 511 and gain change detection unit 513.

Instead of the period during which motor 10 is in a state possibly causing regenerative phenomena, the occurrence determination signal KY can indicate a predetermined period which has passed since the output of the determination release signal KYe, or other periods during which regenerative phenomena can occur.

Upon being informed that motor 10 is in a state possibly causing regenerative phenomena by the occurrence determination signal KY, regeneration reducing means 52 starts a regeneration reduction process to reduce the time change rate of the drive control signal VSP1 outputted from speed control unit 40. Upon being informed that motor 10 has entered a state not causing regenerative phenomena by the occurrence determination signal KY, on the other hand, regeneration reducing means 52 terminates the regeneration reduction process to reduce the time change rate. Regeneration reducing means 52 then outputs the drive control signal VSP2 obtained by the regeneration reduction process according to the determination result of regeneration occurrence determination unit 51.

Motor driving device 100, and motor device 110 having motor driving device 100 according to the present exemplary embodiment are structured as described above.

In the present exemplary embodiment, when host device 16 outputs an acceleration command as the speed command signal Sref so as to accelerate motor 10, speed control unit 40 increases the drive control signal VSP1 corresponding to the difference between the speed command signal Sref and the speed detection signal N. Since the speed command signal Sref increases in this case, regeneration occurrence determination unit 51 does not determine that motor 10 is in a state possibly causing regenerative phenomena. As a result, regeneration reducing means 52 does not perform a regeneration reduction process, and inverter drive unit 30 receives a drive control signal VSP2 which is equal to the drive control signal VSP1. The increase in the drive control signal VSP2 results in an increase in the amplitude of the sinusoidal waveform signal WF generated by waveform generation unit 31. As a result, the driving voltages, which correspond to the waveform signal WF to drive the drive windings, are increased to accelerate motor 10. The information of the increased speed of motor 10 is sent as the speed detection signal N to speed control unit 40. Motor driving device 100 performs this feedback loop control so as to equalize the speed command signal Sref and the speed detection signal N.

When host device 16 outputs a deceleration command as the speed command signal Sref so as to decelerate motor 10, in regeneration occurrence determination unit 51, deceleration detection unit 511 determines that motor 10 is in a state possibly causing regenerative phenomena, and regeneration reducing means 52 performs a regeneration reduction process. Inverter drive unit 30 receives a drive control signal VSP2 obtained by reducing the time change rate of the drive control signal VSP1. Thus, in the case where a deceleration command is outputted as the speed command signal Sref, the feedback loop control is performed to equalize the speed command signal Sref and the speed detection signal N while the driving voltages which correspond to the waveform signal WF to drive the drive windings change more slowly than in the case where the above-described acceleration command is outputted. Motor driving device 100 prevents regenerative phenomena by controlling the driving voltages to change slowly in this manner.

The operations of motor driving device 100 and motor device 110 having motor driving device 100 thus structured in the present exemplary embodiment will be described as follows.

Figure 5:
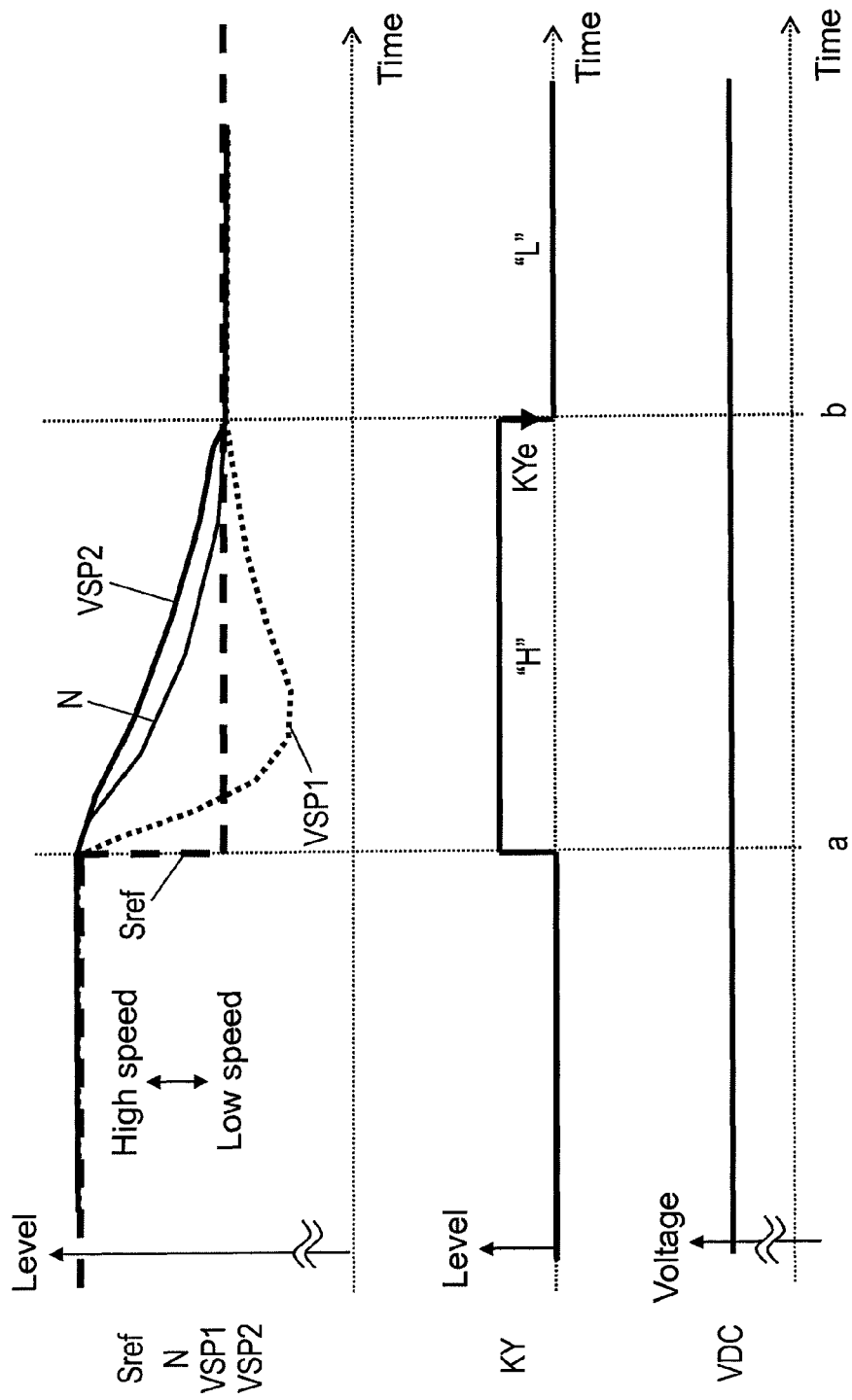
FIG. 5 is a diagram showing an example of the operation of the motor device to reduce regenerative phenomena.
Figure 6:
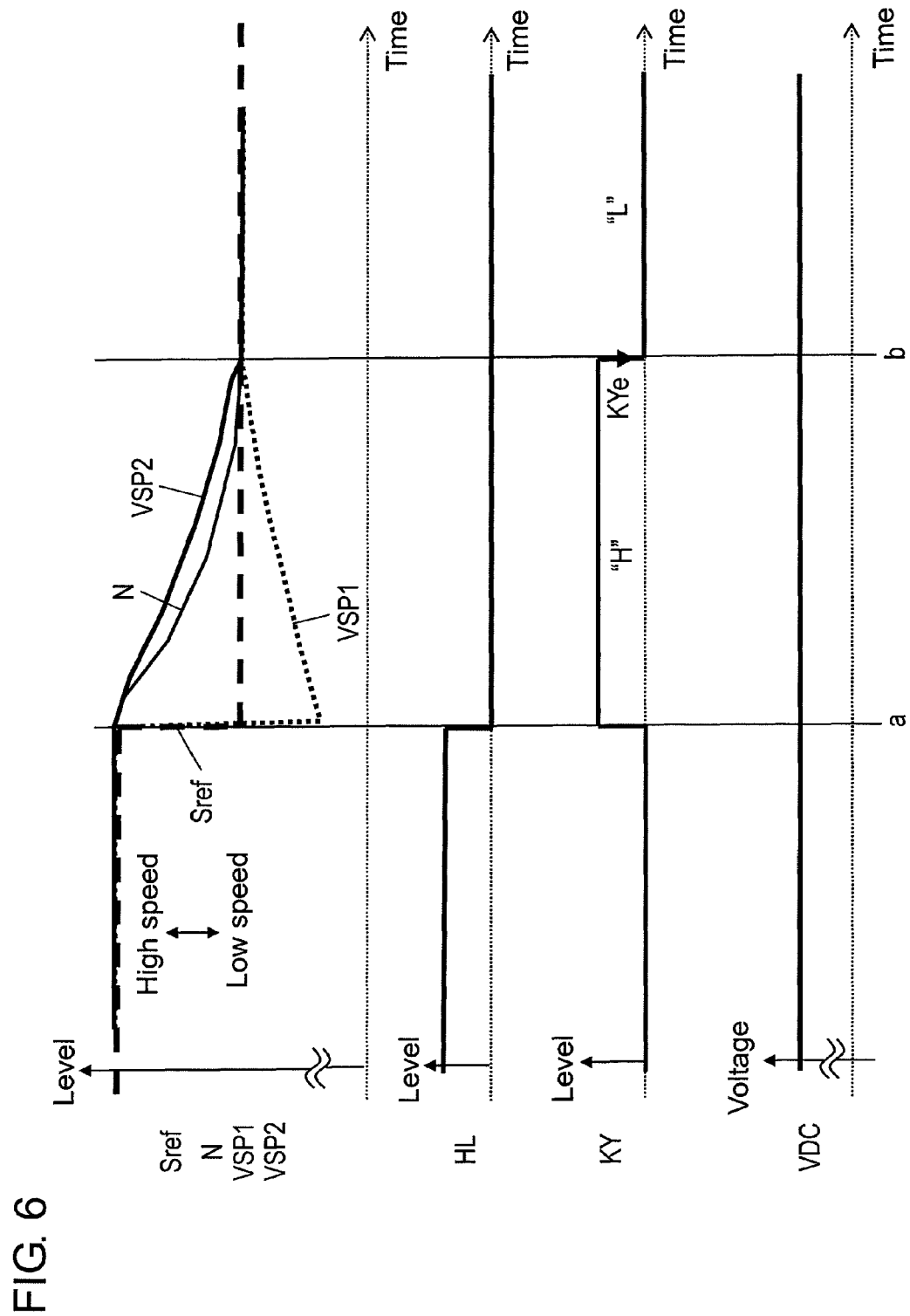
FIG. 6 is a diagram showing another example of the operation of the motor device to reduce regenerative phenomena.

FIG. 3 is a diagram showing the operation of motor device 110 according to the present exemplary embodiment. FIG. 4 is a diagram showing the operation of motor device 110 when a phase advance signal controls the phase of a sinusoidal voltage applied to a drive winding. FIG. 5 is a diagram showing an example of the operation of motor device 110 to reduce regenerative phenomena. FIG. 6 is a diagram showing another example of the operation of motor device 110 to reduce regenerative phenomena.

The following is a description, with reference to FIG. 3, of the operations of motor driving device 100 and motor device 110. The following description will be focused on the action associated with U-phase drive winding 11, which is connected to the driving voltage U of inverter 20.

FIG. 3 shows the sinusoidal waveform signal WF generated by waveform generation unit 31, and a triangular waveform signal CY, which is a PWM carrier signal generated within pulse-width modulation unit 32. The carrier signal CY, which is generally set to have a frequency sufficiently higher than the electrical angle period of motor 10, is shown to have a comparatively low frequency in FIG. 3 for convenience of explanation. The waveform signal WF is compared with the carrier signal CY by pulse-width modulation unit 32. Switches 21 and 22 of inverter 20 are turned on and off complementarily according to the comparison result. As a result, the driving voltage U shown in FIG. 3 is outputted from inverter 20 and applied to winding 11. This allows winding 11 to be supplied with the U-phase drive current Iu and to generate the induced voltage Uemf shown in FIG. 3. As described above, when the mean value is calculated based on the pulse width modulation principle, the driving voltage U becomes a sinusoidal voltage corresponding to the waveform signal WF. Therefore, winding 11 is supplied with the same sinusoidal voltage as the U-phase waveform signal WF.

V-phase drive winding 13 and W-phase drive winding 15 are supplied with sinusoidal voltages as the driving voltages V and W, respectively, from inverter 20 in the same manner as U-phase drive winding 11.

The driving voltages U, V, and W applied to windings 11, 13, and 15, respectively, have a phase difference of an electrical angle of 120 degrees from each other. More specifically, the V-phase waveform signal WF is set to have a phase difference of an electrical angle of 120 degrees with the U-phase waveform signal WF, and the W-phase waveform signal WF is set to have a phase difference of an electrical angle of 120 degrees with the U- and V-phase waveform signals WF. The same operation as in U-phase winding 11 described above is realized in V-phase winding 13 by turning switches 23 and 24 on and off according to the comparison result between the V-phase waveform signal WF and the carrier signal CY. The same operation as in U-phase winding 11 described above is realized in W-phase winding 15 by turning switches 25 and 26 on and off according to the comparison result between the W-phase waveform signal WF and the carrier signal CY.

Thus, windings 11, 13, and 15 are supplied with the sinusoidal voltages and driven by sinusoidal alternating currents.

The phase control operation of advance angle control unit 60 will be described as follows with reference to FIG. 4.

As described above, the phases of the sinusoidal voltages to be applied to windings 11, 13, and 15 are controlled by the phase advance signal PS outputted from advance angle control unit 60.

The phase advance signal PS from advance angle control unit 60 is inputted to inverter drive unit 30 and acts on waveform generation unit 31. First, waveform generation unit 31 generates a waveform signal WF' corresponding to the position of the moving element of motor 10 using the phase based on the position detection signal CS as a reference phase timing. The position detection signal CS is used to detect the position of a magnetic pole of a magnet incorporated in the moving element, so that the phase relation between the detection signal CS and the induced voltage generated by the drive winding is uniquely determined. In other words, as shown in FIG. 4, the reference phase timing can be a zero-cross timing of the induced voltage Uemf generated in winding 11. Waveform generation unit 31 advances the phase of the waveform signal WF', which is generated according to the reference phase timing, according to the phase advance signal PS. Waveform generation unit 31 then outputs a phase-advanced waveform signal WF to pulse-width modulation unit 32. Thus, U-phase winding 11 can be supplied with the sinusoidal driving voltage U whose phase can be controlled by the phase advance signal PS.

The phase control thus performed by advance angle control unit 60 can increase the drive efficiency of motor 10. More specifically, first, the delay in phase of the drive current Iu with respect to the mean value of the driving voltage U (corresponding to the waveform signal WF) caused by the inductance component of the drive winding is adjusted by the phase advance signal PS from advance angle control unit 60. Then, the phase is advanced from the waveform signal WF' to the waveform signal WF so as to nullify the phase difference between the induced voltage Uemf of the drive winding and the drive current Iu. Such phase control can increase the drive efficiency. This holds true not only for U-phase winding 11 but also for V- and W-phase windings 13 and 15.

On the other hand, as described above, the peak values of the sinusoidal voltages to be applied to windings 11, 13, and 15 are controlled based on the drive control signal VSP1 from speed control unit 40. The following is a description of the control of the peak values to be applied to the windings. The following description will be focused on the U-phase drive winding with reference to FIG. 4, but holds true also for the V- and W-phase drive windings.

The drive control signal VSP1 from speed control unit 40 is inputted as the drive control signal VSP2 to inverter drive unit 30 via regeneration reducing means 52. In inverter drive unit 30, the peak value of the sinusoidal waveform signal WF generated by waveform generation unit 31 is adjusted according to the drive control signal VSP2 based on the drive control signal VSP1. Pulse width modulation unit 32 performs pulse width modulation according to the waveform signal WF whose peak value is adjusted by the drive control signal VSP2. As a result, U-phase winding 11 is supplied with the sinusoidal driving voltage whose peak value is controlled by the drive control signal VSP2.

The drive control signal VSP1 generates speed control unit 40 by multiplying the predetermined control gain by the difference between the speed command signal Sref from host device 16 via input terminal 17 and the speed detection signal N from motor 10.

More specifically, when the speed detection signal N is higher than the speed command signal Sref, the drive control signal VSP1 is decreased to reduce the driving voltage of the drive winding. As a result, motor 10 is decelerated approaching the speed indicated by the speed command signal Sref. When the speed detection signal N is lower than the speed command signal Sref, on the other hand, the drive control signal VSP1 is increased to increase the driving voltage of the drive winding. As a result, motor 10 is accelerated approaching the speed indicated by the speed command signal Sref. With this operation, the speed command signal Sref and the speed detection signal N are controlled to become substantially the same. Host device 16 thus sends the speed command signal Sref as a speed command to motor driving device 100, thereby controlling the speed of motor 10.

The control gain multiplied by the difference between the speed command signal Sref and the speed detection signal N when the drive control signal VSP1 is outputted from speed control unit 40 is set within speed control unit 40 so as to achieve a stable speed control of motor 10. The setting of the control gain can be changed by the switching signal HL. Since a control gain to achieve stable speed control changes depending on the control speed of motor 10, motor 10 can be stabilized by making the control gain changeable. More specifically, host device 16 sends the switching signal HL to motor driving device 100 so that the control gain can be set properly in either a high-speed range or a low-speed range depending on whether the speed command indicated by the speed command signal Sref from host device 16 represents the high-speed range or the low-speed range. In motor driving device 100, speed control unit 40 receives the signal and sets the control gain according to the switching signal HL.

The following is a description, with reference to FIGS. 5 and 6, of the operation of regeneration preventing means 50 to reduce regenerative phenomena in the present exemplary embodiment.

In regeneration preventing means 50, regeneration occurrence determination unit 51 receives the control information group INF from speed control unit 40 and determines whether motor 10 is in a state possibly causing regenerative phenomena or in a state not causing regenerative phenomena. Regeneration occurrence determination unit 51 then sends the occurrence determination signal KY to regeneration reducing means 52 to inform whether or not motor 10 is in a state possibly causing regenerative phenomena. Regeneration reducing means 52 performs a regeneration reduction process to reduce the time change rate of the drive control signal VSP1 during the period after receiving the occurrence determination signal KY indicating that motor 10 is in a state possibly causing regenerative phenomena until receiving the signal KY indicating that motor 10 enters a state not causing regenerative phenomena.

FIG. 5 shows an example of the operation to reduce regenerative phenomena. FIG. 5 particularly shows how the occurrence determination signal KY indicating that regenerative phenomena can occur is outputted (level H) when the deceleration command as the speed command signal Sref is detected and the first information is outputted. Then, as shown in FIG. 5, the determination release signal KYe is outputted according to the fourth information so as to release the regeneration reduction process (level L).

In FIG. 5, at the timing of time "a", the speed command indicated by the speed command signal Sref changes from a high speed drive command to a low speed drive command. Deceleration detection unit 511 detects the change from the high to the low speed command, and outputs first information. As a result, regeneration occurrence determination unit 51 outputs to regeneration reducing means 52 a occurrence determination signal KY indicating that regenerative phenomena can occur. Upon receiving the signal, regeneration reducing means 52 starts a regeneration reduction process to reduce regenerative phenomena.

Figure 12:
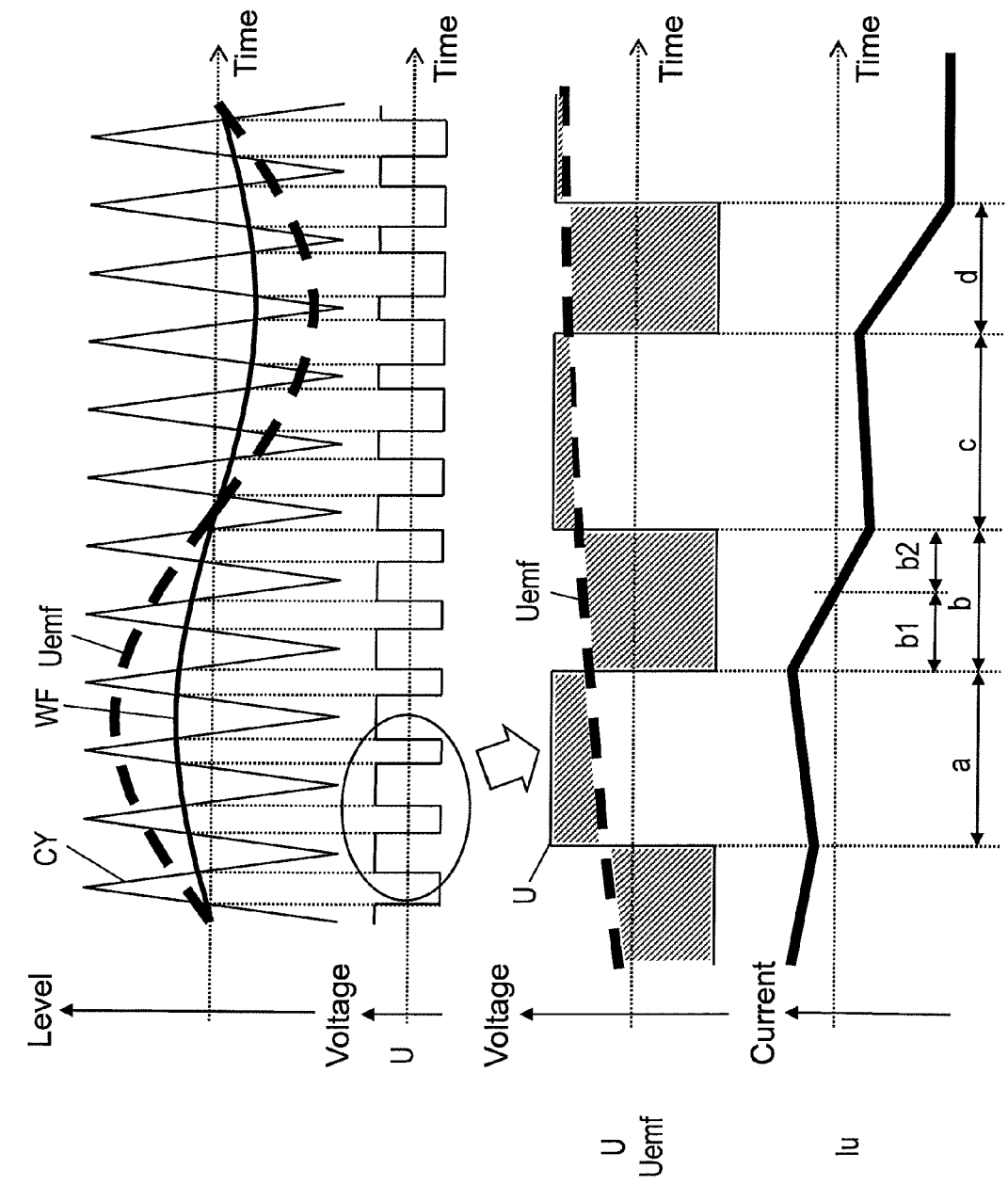
FIG. 12 is a diagram showing a regenerative phenomenon observed in the motor driving device.
Figure 13:
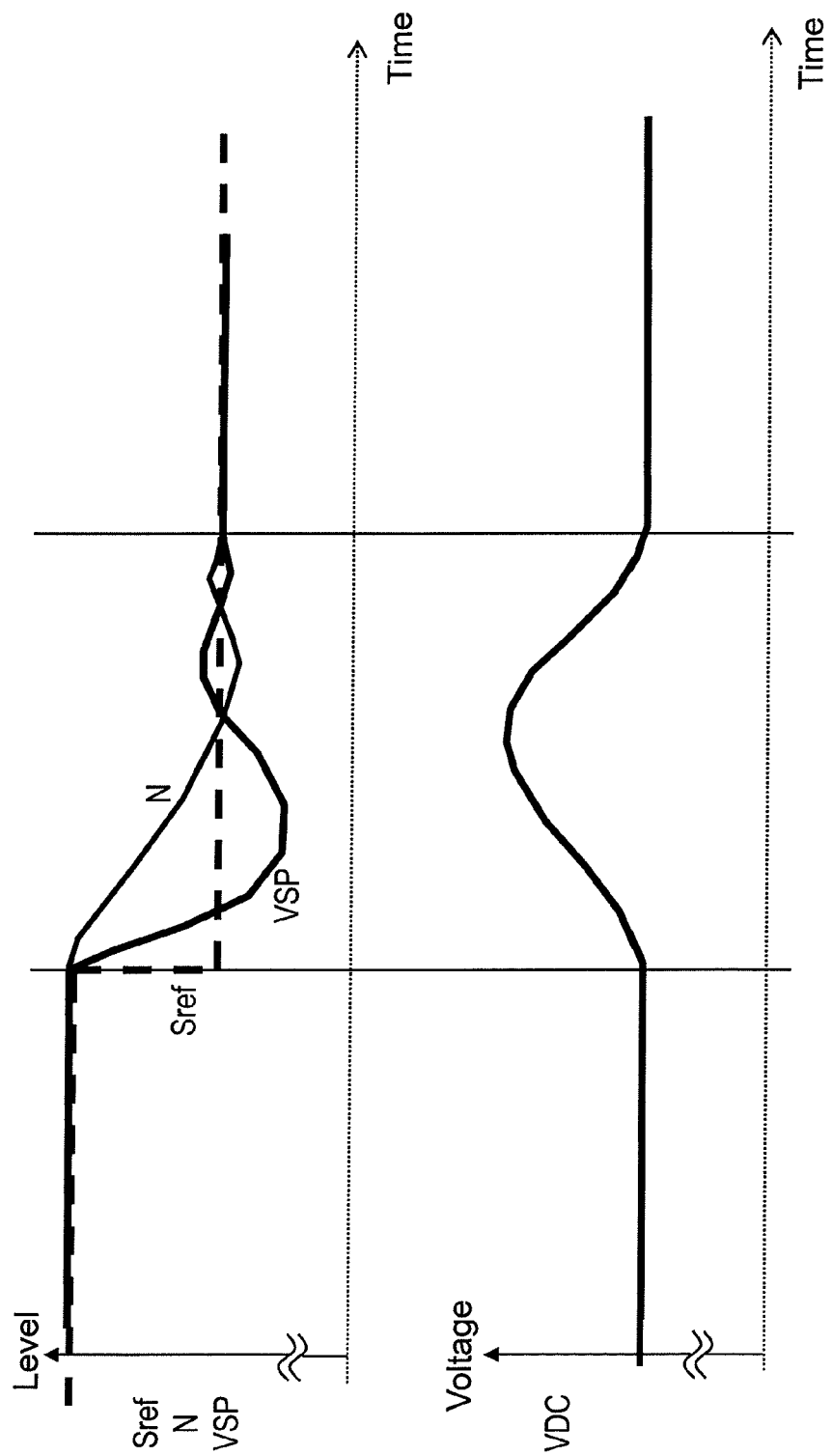
FIG. 13 is a diagram showing a voltage increase in a DC power supply caused by the regenerative phenomenon in the motor driving device.
Figure 14:
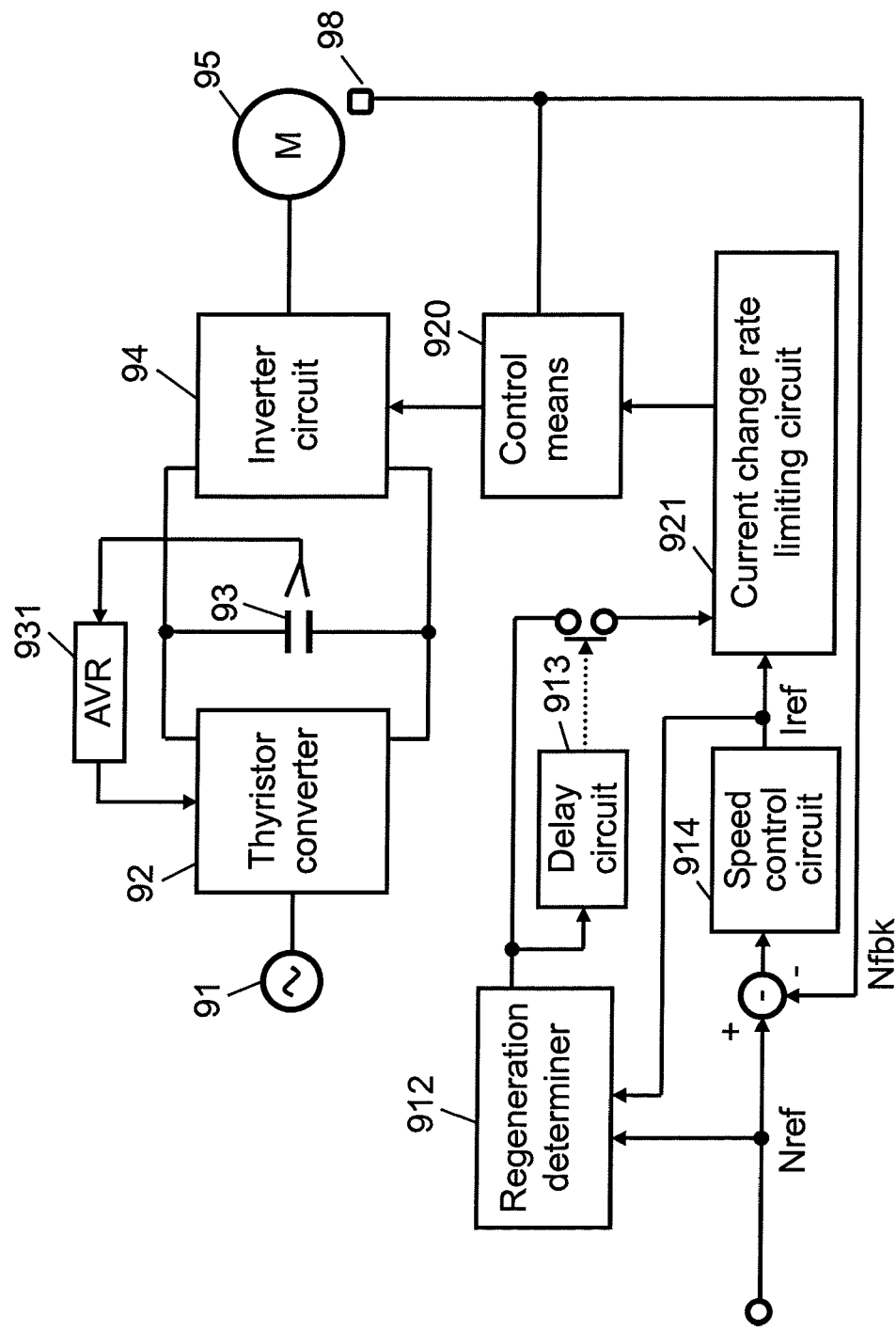
FIG. 14 is a configuration diagram of a conventional regeneration control device.

When the speed command signal Sref changes from the high speed to the low speed drive command as shown in FIG. 5, speed control unit 40 greatly decreases the drive control signal VSP1 and starts to decelerate the motor. The decrease in the drive control signal VSP1 greatly decreases the output of inverter 20, that is, the driving voltage of the drive winding, making it lower than the induced voltage generated in the drive winding. As a result, when the drive winding is supplied with the driving voltage according to the drive control signal VSP1, a regenerative phenomenon occurs as shown in FIG. 12.

In the present exemplary embodiment, however, the occurrence of such a regenerative phenomenon is prevented by performing the regeneration reduction process while outputting the occurrence determination signal KY indicating that regenerative phenomena can occur.

As described above, the regeneration reduction process performed by regeneration reducing means 52 reduces the time change rate so as to reduce the large decrease in the drive control signal VSP1. More specifically, regeneration reducing means 52 generates a drive control signal VSP2 that decreases more slowly than the actual decrease in the drive control signal VSP1 as shown in FIG. 5. The waveform signal WF controlled by the drive control signal VSP2 drives the drive winding. The driving voltage to be applied to the drive winding according to the drive control signal VSP2 is set not to be lower than the induced voltage generated in the drive winding. Therefore, the drive control signal VSP2 decreases slowly according to the decrease in the induced voltage following the deceleration of the motor. The drive control signal VSP2 decreasing more slowly than the drive control signal VSP1 drives the drive winding. This operation can prevent the driving voltage of the drive winding from becoming lower than the induced voltage, thereby preventing regenerative phenomena.

When the deceleration of motor 10 is completed at the timing of time "b", the speed detection signal N and the speed command signal Sref indicate the same speed. Therefore, speed attainment detection unit 514 outputs fourth information, thereby releasing the occurrence determination signal KY indicating that regenerative phenomena can occur. Releasing the occurrence determination signal KY indicating that regenerative phenomena can occur results in the releasing of the control of the driving voltage according to the drive control signal VSP2 generated by subjecting the drive control signal VSP1 to a regeneration reduction process. As a result, the normal state is resumed to control the driving voltage by the drive control signal VSP2 that is equal to the drive control signal VSP1.

FIG. 6 shows another example of the operation to reduce regenerative phenomena. FIG. 6 particularly shows how the occurrence determination signal KY indicating that regenerative phenomena can occur is outputted (level H) as a result that the third information is issued, that is, the control gain is changed according to the switching signal HL, and also shows how the occurrence determination signal KY indicating that regenerative phenomena can occur is released (level L) according to the fourth information.

In FIG. 6, at the timing of time "a", the switching signal HL is changed so as to change the control gain. Gain change detection unit 513 detects the change of the gain and then outputs third information. As a result, regeneration occurrence determination unit 51 outputs to regeneration reducing means 52 the occurrence determination signal KY indicating that regenerative phenomena can occur. Upon receiving the signal, regeneration reducing means 52 starts a regeneration reduction process to reduce regenerative phenomena.

As shown in FIG. 6, the change of the switching signal HL results in a change in the control gain set within speed control unit 40. At this moment, the drive control signal VSP1 may greatly decrease at time "a" as shown in FIG. 6, for example, because the output value of the drive control signal VSP1 is different between immediately before and immediately after the change of the control gain. Such a large decrease in the drive control signal VSP1 causes regenerative phenomena in the same manner as in the case of FIG. 5.

The regenerative phenomena are reduced by reducing the large decrease in the drive control signal VSP1 in the same manner as in the case of FIG. 5. More specifically, regeneration reducing means 52 generates a drive control signal VSP2 that decreases more slowly than the actual decrease in the drive control signal VSP1 as shown in FIG. 6, and the waveform signal WF controlled by the drive control signal VSP2 drives the drive winding.

When the speed indicated by the speed detection signal N overshoots the speed indicated by the speed command signal Sref, motor 10 is required to be decelerated to reach the speed indicated by the speed command. Therefore, in regeneration occurrence determination unit 51, overshoot detection unit 512 detects the overshoot, and regeneration reducing means 52 performs the above-described regeneration reduction process.

As described above, motor driving device 100 according to the present exemplary embodiment includes an inverter, speed control unit 40, and regeneration preventing means 50. Speed control unit 40 generates a speed control signal group based on the command information and the speed detection information, and adjusts the driving power based on the drive control signal VSP1 included in the speed control signal group so as to control the speed of the motor. Regeneration preventing means 50 determines whether or not motor 10 is in a state possibly causing regenerative phenomena based on the command information and the speed detection information. Regeneration preventing means 50 then performs a regeneration reduction process to reduce regenerative phenomena according to the determination result so as to prevent regenerative phenomena.

Motor driving device 100 further includes regeneration occurrence determination unit 51 for determining whether or not motor 10 is in a state possibly causing regenerative phenomena based on the command information and the speed detection information, and regeneration reducing means 52 for performing a regeneration reduction process according to the determination result of regeneration occurrence determination unit 51. Regeneration reducing means 52 starts the regeneration reduction process when regeneration occurrence determination unit 51 determines that motor 10 is in a state possibly causing regenerative phenomena, and releases the regeneration reduction process when regeneration occurrence determination unit 51 determines that motor 10 has entered a state not causing regenerative phenomena.

Thus, in motor driving device 100 according to the present exemplary embodiment, regenerative phenomena are kept reduced during the period after motor 10 enters a state possibly causing regenerative phenomena until motor 10 enters a state not causing regenerative phenomena. This prevents the generation of regenerative power returning to motor driving device 100 or DC power supply 105 so as to reduce the regenerative energy returning from motor 10 to motor driving device 100 and DC power supply 105. This prevents the occurrence of overvoltage which increases the voltage of the DC circuit. Thus, motor driving device 100 does not need to be provided in the vicinity of the motor with a circuit for detecting a voltage increase due to regenerative phenomena, a circuit for returning regenerative power to the power supply device, or a power supply device for absorbing regenerative power. As a result, motor driving device 100 has high reliability and high convenience.

In motor driving device 100, regeneration occurrence determination unit 51 includes speed attainment detection unit 514, which detects that the speed indicated by the speed detection signal N has attained the speed indicated by the speed command signal Sref, and outputs fourth information indicating the detection of the speed attainment. When the detection of the speed attainment is informed by the fourth information, regeneration occurrence determination unit 51 determines that the motor has entered a state not causing regenerative phenomena.

With this structure, the time point when motor 10 has entered a state possibly causing regenerative phenomena is determined, for example, by the control information of at least one of first, second, and third information. The time point when motor 10 has entered a state not causing regenerative phenomena is determined by the fourth information. This allows the accurate determination of the period after the motor enters a state possibly causing regenerative phenomena until the motor enters a state not causing regenerative phenomena. A regenerative phenomenon occurs not only when the motor is decelerated, but also when the motor is accelerated or when the load applied to the motor suddenly changes in a control action (when a deceleration command is issued) to reduce an overshoot, which is a speed overshoot. Motor driving device 100 detects the time point when motor 10 has entered a state possibly causing regenerative phenomena under all possible conditions, and detects that motor 10 has entered a state not causing regenerative phenomena based on the actually measured speed detection signal N. As a result, motor driving device 100 can accurately determine the presence or absence of regenerative phenomena.

Second Exemplary Embodiment

Figure 7:
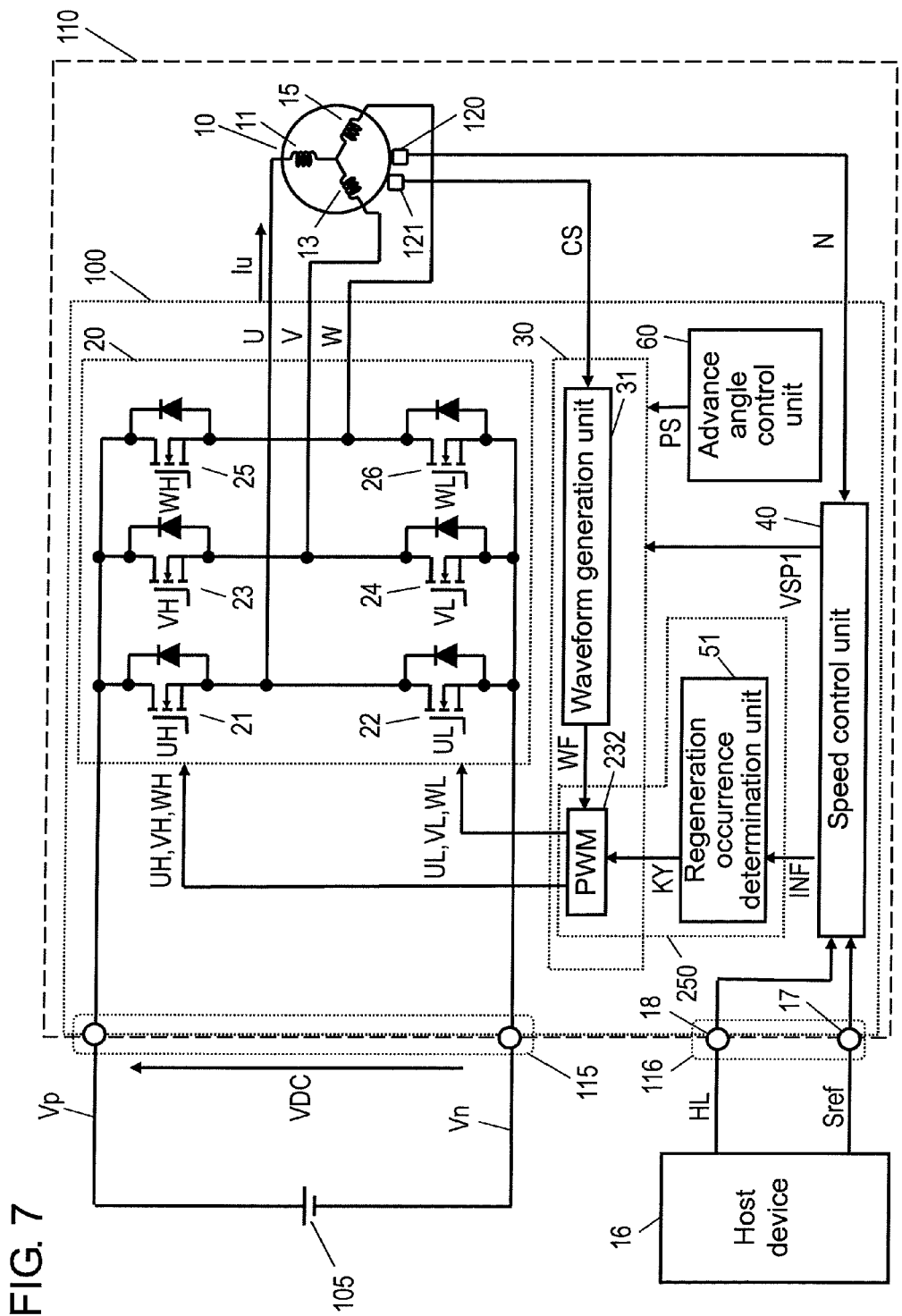
FIG. 7 is a configuration diagram showing a motor device including a motor driving device according to a second exemplary embodiment of the present invention.

FIG. 7 is a configuration diagram showing motor device 110 including motor driving device 100 according to a second exemplary embodiment of the present invention.

Unlike motor driving device 100 according to the first exemplary embodiment shown in FIG. 1, in motor driving device 100 according to the second exemplary embodiment, inverter drive unit 30 includes pulse-width modulation unit 232, which also functions as a regeneration reducing means in the regeneration preventing means. As described in the conventional art, regenerative phenomena occur when switch elements 21 and 22 and the other switch elements composing inverter 20 are turned on and off complementarily. Therefore, regenerative phenomena can be prevented by turning one switch element on and off while the other switch element is in the OFF state, instead of turning both switch elements on and off complementarily.

More specifically, in motor driving device 100 of the present exemplary embodiment, pulse-width modulation unit 232 functions also as a regeneration reducing means in regeneration preventing means 250, and pulse-width modulation unit 232 outputs drive signals UH, VH, WH, UL, VL, and WL having different waveforms from those in the first exemplary embodiment. In the present exemplary embodiment, this structure prevents regenerative phenomena.

Motor driving device 100 according to the second exemplary embodiment thus structured will be described as follows. In FIG. 7, like components are labeled with like reference numerals with respect to the first exemplary embodiment, and these components are not described again in detail.

Figure 8:
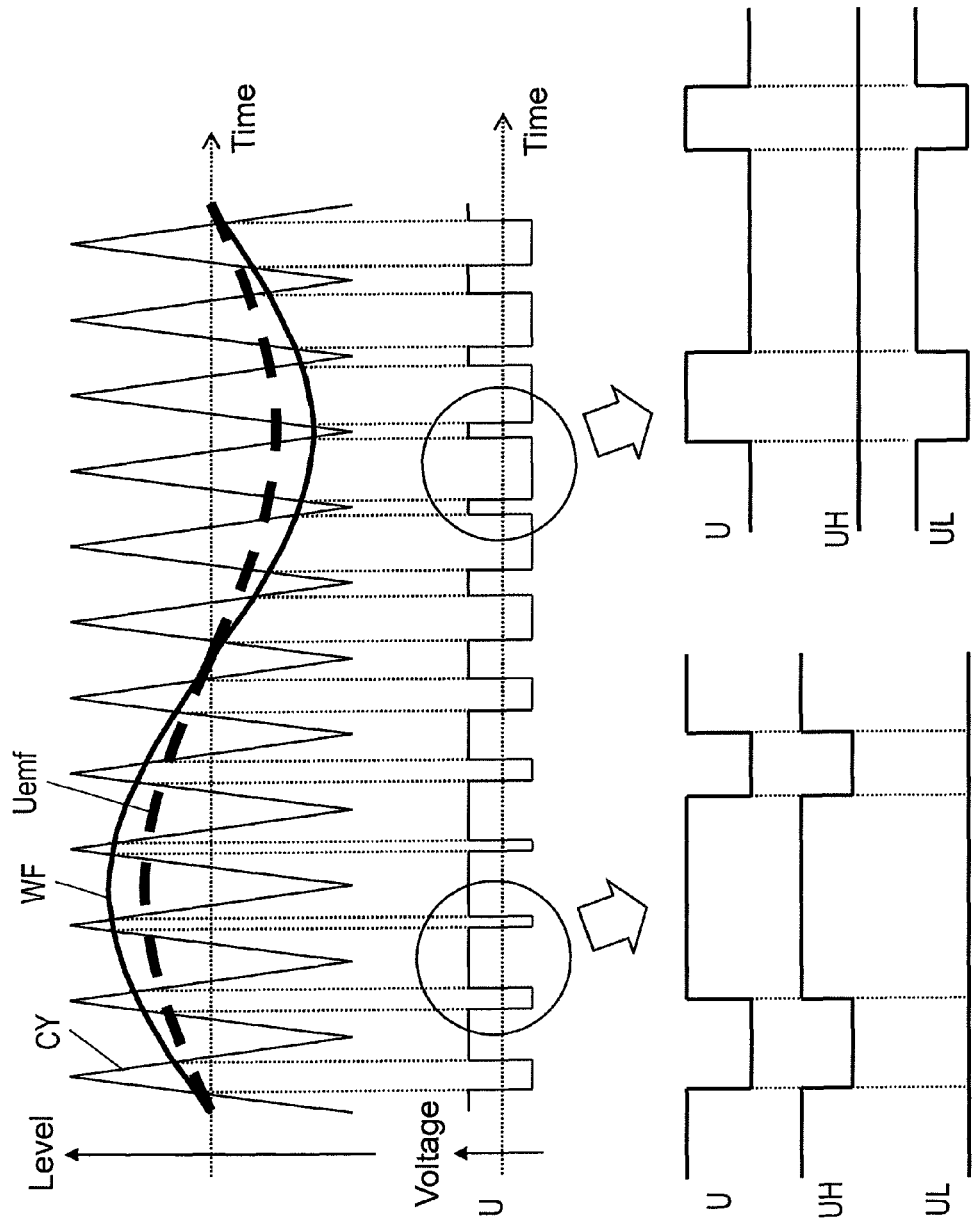
FIG. 8 is a diagram showing the operation of the motor device.

FIG. 8 is a diagram showing the operation of motor device 110 according to the present exemplary embodiment, and more specifically the operation of motor driving device 100 according to the present exemplary embodiment to perform a process to reduce regenerative phenomena. The following is a description, with reference to FIG. 8, of the control of the switch elements by the drive signals UH, VH, WH, UL, VL, and WL from pulse-width modulation unit 232 so as to prevent regenerative phenomena. The following description will be focused on the U-phase drive winding, but holds true for the V- and W-phase drive windings.

FIG. 8 shows a sinusoidal waveform signal WF generated by waveform generation unit 31, and a triangular waveform signal CY, which is a PWM carrier signal generated within pulse-width modulation unit 232. Winding 11 is driven by the driving voltage U corresponding to the waveform signal WF.

FIG. 8 also shows the waveforms of drive signals UH and UL outputted from pulse-width modulation unit 232. These drive signals whose waveforms are not complementary are supplied to switches 21 and 22. Switch 22 is in the OFF state while switch 21 is turned on and off according to the waveform signal WF. In contrast, switch 21 is in the OFF state while switch 22 is turned on and off according to the waveform signal WF.

Figure 9:
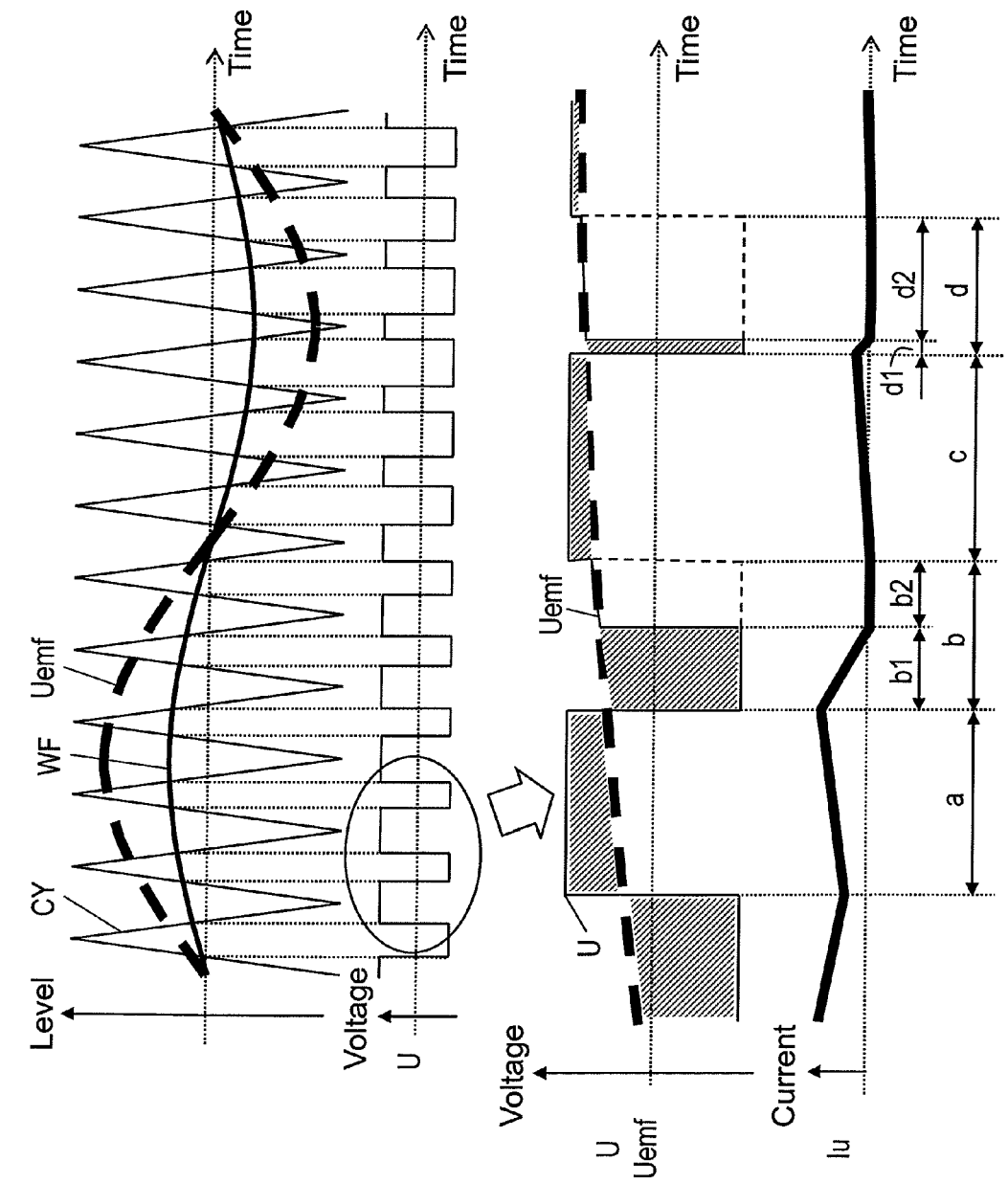
FIG. 9 is a diagram showing an example of the operation of the motor device to reduce regenerative phenomena.
Figure 10:
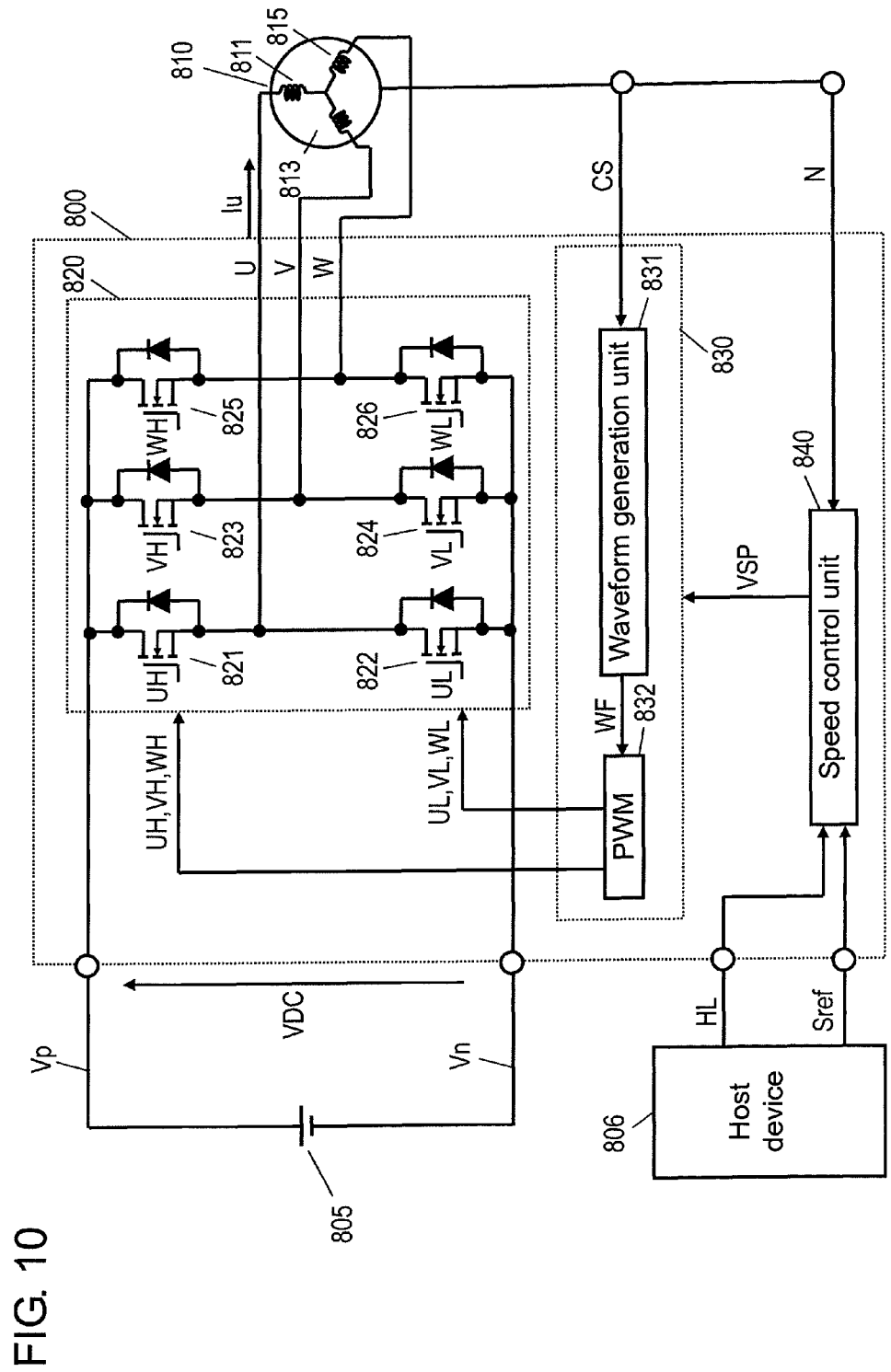
FIG. 10 is a configuration diagram including a conventional motor driving device.

FIG. 9 shows an example of the operation of motor device 110 to reduce regenerative phenomena according to the present exemplary embodiment, and more specifically to reduce regenerative phenomena by thus controlling the switch elements of inverter 20.

First, in a period "a" of FIG. 9, switch 21 is in the ON state, and switch 22 is in the OFF state. As a result, winding 11 is connected to the positive-electrode-side power supply line Vp of DC power supply 105, and the instantaneous value of the driving voltage U becomes the voltage of the positive-electrode-side power supply line Vp. In the period "a", the driving voltage U is higher than the induced voltage Uemf of winding 11, thus increasing the current Iu of winding 11. The increment depends on the voltage (shown in the area hatched in the period "a" of FIG. 9) obtained by subtracting the voltage Uemf from the voltage U. When the mean value of the driving voltage U is smaller than the induced voltage Uemf, however, the difference is small, and the current increase is also small.

Next, in a period "b", switch 21 is turned off, and switch 22 is still in the OFF state. When switch 21 is turned off, the diode connected antiparallel to switch 22 is conducted, so that winding 11 is connected to the negative-electrode-side power supply line Vn of DC power supply 105. The instantaneous value of the driving voltage U becomes the voltage of the negative-electrode-side power supply line Vn.

In the period "b", the driving voltage U is lower than the induced voltage Uemf of winding 11, thus decreasing the current Iu of winding 11. The decrement depends on the voltage (shown in the area hatched in the period "b" of FIG. 9) obtained by subtracting the driving voltage U from the induced voltage Uemf. When the mean value of the driving voltage U is smaller than the induced voltage Uemf, however, the difference is large, and the current decrease is also large.

In a period "b1" of the period "b", the current Iu reaches winding 11 after flowing through the diode connected anti-parallel to switch 22, and then continues to decrease. In a period "b2" before which the current Iu decreases to zero, switch 22 is still in the OFF state, so that the current Iu is zero.

Therefore, the current Iu never flows in the direction in which a current is supplied from the induced voltage Uemf as in the conventional example of FIG. 12. In the period "b2" where the current Iu is zero, the output of inverter 20 consists exclusively of the induced voltage Uemf of winding 11.

In a period "c", switch 21 is in the ON state as in the period "a", and switch 22 is still in the OFF state. As a result, the current Iu increases as in the period "a", but the increment is small. In the period "c", the current Iu flows from the positive-electrode-side power supply line Vp to winding 11 via switch 21 on the positive-electrode side.

In a period "d", switch 21 is in the OFF state as in the period "b", and switch 22 is still in the OFF state. Therefore, in a period "d1", as in the period "b", the current Iu reaches winding 11 after flowing through the diode connected anti-parallel to switch 22, and then continues to decrease. In a period "d2" before which the current Iu decreases to zero, switch 22 is still in the OFF state, so that the current Iu becomes zero. Therefore, in the period "d2", the current Iu never flows in the direction in which a current is supplied from the induced voltage Uemf as in the conventional example of FIG. 12.

This means that the current from the induced voltage of the drive winding never flows toward DC power supply 105, which is the direction opposite to the intended direction, that is, no regenerative phenomena occur. The above-described operation also holds true for windings 13 and 15.

Thus, it is possible to prevent regenerative phenomena by turning one switch element on and off while the other switch element is in the OFF state. By using this principle, pulse-width modulation unit 232 turns one switch element on and off while the other switch element is in the OFF state during the period when the occurrence determination signal KY from regeneration occurrence determination unit 51 indicates that motor 10 is in a state possibly causing regenerative phenomena. Pulse width modulation unit 232 drives one switch element and the other switch element complementarily during the period when no regenerative phenomena occur.

Thus, motor driving device 100 according to the present exemplary embodiment reduces regenerative phenomena by controlling a regeneration reduction process so that pulse-width modulation unit 232 as a regeneration reducing means can drive the switch elements only on one of the positive- and negative-electrode sides, of all switch elements of inverter 20. In motor driving device 100 according to the present exemplary embodiment, regeneration preventing means 250 includes the regeneration reducing means for reducing regenerative phenomena, thereby preventing regenerative phenomena.

As described hereinbefore, in motor device 110 including motor driving device 100 according to the first or second exemplary embodiment, drive windings 11, 13, and 15 are driven by sinusoidal alternating currents. In addition, the phase difference between an induced voltage generated in a drive winding according to the phase advance signal PS from advance angle control unit 60 and the drive current flowing to the winding is adjusted to be substantially zero. As a result, motor 10 is sine-wave driven at high efficiency with low levels of torque ripple, noise, and vibration.

In addition, the increase or decrease in the drive control signal VSP1 from speed control unit 40 is realized by a component inside motor driving device 100. As a result, host device 16 can control the speed of the motor, which is assured to be sine-wave driven at high efficiency, only by outputting the speed command indicated by the speed command signal Sref to motor driving device 100.

Motor driving device 100 further includes regeneration preventing means 50 or 250. Regeneration occurrence determination unit 51 determines whether motor 10 is in a state possibly causing regenerative phenomena or in a state not causing regenerative phenomena, using the control information group INF of motor 10 detectable by speed control unit 40. Regeneration occurrence determination unit 51 outputs the occurrence determination signal KY to either regeneration reducing means 52 or pulse-width modulation unit 232 when motor 10 is in a state possibly causing regenerative phenomena, and releases the output when motor 10 is in a state not causing regenerative phenomena. Motor device 110 thus reduces regenerative phenomena so as to prevent an increase in the output voltage of the DC power supply, thereby protecting the motor driving device, the power supply device, and a device mounted with the power supply device from damage. Thus, motor device 110 becomes safer, more reliable, and operable without the need to consider regeneration, thus improving its convenience.

When the motor driving device including the inverter, the speed control unit, and the regeneration preventing means is built-in or integrated with the motor device, the host device mounted with the motor driving can provide a motor that is sine-wave driven with low levels of torque ripple, noise, and vibration easily and safely without the need to consider regenerative phenomena. Furthermore, part or all of the functions of the motor driving device can be integrated as an integrated circuit device. This allows the motor driving device to be reduced in size, and hence to be built-in or integrated with the motor device. As a result, the host device can have a simpler design and a lower control burden, thereby spreading the use of a sine-wave driven motor with excellent performance.

Industrial Applicability

Regenerative phenomena Regenerative phenomena are caused when the switch elements composing an inverter are turned on and off complementarily. The complementary on-off operation is often used to sine-wave drive a motor with low levels of noise and vibration.

The motor driving device of the present invention includes an inverter, a speed control unit for controlling to drive the motor at a desired speed, and a regeneration preventing means for reducing regeneration based on the control information group of the motor detectable by the speed control unit. These components are built-in or integrated with the motor so as to reduce regenerative phenomena. This allows the function for regeneration reduction to be self-contained within the motor. The host device mounted with the motor and the motor driving device can provide a speed-controllable, sine-wave driven motor easily and safely without the need to consider regenerative phenomena, only by outputting a reference signal as the speed command of the motor to the motor driving device.

Hence, the motor driving device of the present invention is suitable for driving a motor used in the following devices that are required to be sine-wave driven with low levels of vibration and noise without the need to consider regenerative phenomena. The devices include fan motors of air conditioners, water heaters equipped with a combustion fan motor; household electrical appliances such as air cleaners, refrigerators, and washing machines; printers, copying machines, scanners, fax machines, and complex machines thereof; and information devices such as hard disks and optical media devices.

The invention claimed is:

1. A motor driving device for driving a motor including a speed detector to detect a speed of a moving element of the motor and for outputting the speed as speed detection information, the motor driving device comprising:
   an inverter for converting supplied DC power to driving power for driving the motor, and for supplying the driving power to the motor;
   a speed control unit for generating a speed control signal group based on command information received externally and the speed detection information received from the speed detector, and for adjusting the driving power based on a drive control signal included in the speed control signal group, thereby controlling the speed of the motor; and
   a regeneration preventing means for determining whether the motor is in a state possibly causing regenerative phenomena or in a state not causing regenerative phenomena based on the command information and the speed detection information, and for performing a regeneration reduction process to reduce the regenerative phenomena according to the determination result, thereby preventing the regenerative phenomena.

2. The motor driving device of claim 1, wherein the regeneration preventing means includes:
   a regeneration occurrence determination unit for determining whether the motor is in a state possibly causing regenerative phenomena or in a state not causing regenerative phenomena based on the command information and the speed detection information; and
   a regeneration reducing means for performing the regeneration reduction process according to the determination result of the regeneration occurrence determination unit, wherein
   the regeneration reducing means starts the regeneration reduction process when the regeneration occurrence determination unit determines that the motor is in a state possibly causing regenerative phenomena, and releases the regeneration reduction process when the regeneration occurrence determination unit determines that the motor is in a state not causing regenerative phenomena.

3. The motor driving device of claim 2, wherein the command information includes speed command information to command the speed of the motor;
   the regeneration occurrence determination unit includes:
   a deceleration detection unit for detecting a deceleration command from the speed command information, and for outputting first information indicating detection of the deceleration command; and
   when the detection of the deceleration command is presented by the first information, the regeneration occurrence determination unit determines that the motor is in a state possibly causing regenerative phenomena.

4. The motor driving device of claim 3, wherein the regeneration occurrence determination unit includes:
   a speed attainment detection unit for detecting, from the speed command information and the speed detection information, that a speed indicated by the speed detection information has attained a speed indicated by the speed command information, and for outputting fourth information indicating detection of speed attainment, wherein
   when the detection is presented by the fourth information, the regeneration occurrence determination unit determines that the motor has entered a state not causing regenerative phenomena.

5. The motor driving device of claim 2, wherein the command information includes speed command information to command the speed of the motor;
   the regeneration occurrence determination unit includes:
   a deceleration detection unit for detecting a deceleration command from the speed command information, and for outputting first information indicating detection of the deceleration command; and
   an overshoot detection unit for detecting, from the speed command information and the speed detection information, an overshoot which means that a speed indicated by the speed detection information is higher than a speed indicated by the speed command information, and for outputting second information indicating detection of the overshoot, wherein
   when the detection is presented by at least one of the first information and the second information, the regeneration occurrence determination unit determines that the motor is in a state possibly causing regenerative phenomena.

6. The motor driving device of claim 5, wherein the regeneration occurrence determination unit includes:
   a speed attainment detection unit for detecting, from the speed command information and the speed detection information, that a speed indicated by the speed detection information has attained a speed indicated by the speed command information, and for outputting fourth information indicating detection of speed attainment, wherein
   when the detection is presented by the fourth information, the regeneration occurrence determination unit determines that the motor has entered a state not causing regenerative phenomena.

7. The motor driving device of claim 2, wherein the command information includes speed command information to command the speed of the motor, and gain change command information to change a control gain in the speed control unit;
   the regeneration occurrence determination unit includes:
   a deceleration detection unit for detecting a deceleration command from the speed command information, and for outputting first information indicating detection of the deceleration command; and
   a gain change detection unit for detecting a control gain change command from the gain change command information, and for outputting third information indicating detection of the control gain change command, wherein
   when the detection is presented at least one of the first information and the third information, the regeneration occurrence determination unit determines that the motor is in a state possibly causing regenerative phenomena.

8. The motor driving device of claim 7, wherein the regeneration occurrence determination unit includes:
   a speed attainment detection unit for detecting, from the speed command information and the speed detection information, that a speed indicated by the speed detection information has attained a speed indicated by the speed command information, and for outputting fourth information indicating detection of speed attainment, wherein when the detection is presented by the fourth information, the regeneration occurrence determination unit determines that the motor has entered a state not causing regenerative phenomena.

9. The motor driving device of claim 2, wherein
the command information includes speed command information to command the speed of the motor, and gain change command information to change a control gain in the speed control unit;
the regeneration occurrence determination unit includes;
  a deceleration detection unit for detecting a deceleration command from the speed command information, and for outputting first information indicating detection of the deceleration command;
  an overshoot detection unit for detecting, from the speed command information and the speed detection information, an overshoot which means that a speed indicated by the speed detection information is higher than a speed indicated by the speed command information, and for outputting second information indicating detection of the overshoot; and
  a gain change detection unit for detecting a control gain change command from the gain change command information, and for outputting third information indicating detection of the control gain change command, wherein
when the detection is presented by at least one of the first information, the second information, and the third information, the regeneration occurrence determination unit determines that the motor is in a state possibly causing regenerative phenomena.

10. The motor driving device of claim 9, wherein
the regeneration occurrence determination unit includes:
  a speed attainment detection unit for detecting, from the speed command information and the speed detection information, that a speed indicated by the speed detection information has reached a speed indicated by the speed command information, and for outputting fourth information indicating detection of attainment, wherein when the detection is presented by the fourth information, the regeneration occurrence determination unit determines that the motor has entered a state not causing regenerative phenomena.

11. The motor driving device of claim 2, wherein
the regeneration reducing means performs the regeneration reduction process to reduce a time change rate of the drive control signal for adjusting the driving power.

12. The motor driving device of claim 2, wherein
the inverter includes a plurality of switch elements connected to a positive-electrode side of the DC power, and a plurality of switch elements connected to a negative-electrode side of the DC power; and
the regeneration reducing means controls the regeneration reduction process so as to drive only the switch elements on one of the positive-electrode side and the negative-electrode side, of all switch elements.

13. An integrated circuit device comprising the motor driving device of claim 1.

14. A motor device comprising:
a motor;
a speed detector for detecting a speed of a moving element of the motor;
the integrated circuit device of claim 13;
a power input terminal for receiving DC power; and
a command information input terminal for receiving command information.

15. The motor device of claim 14, wherein
the motor is a brushless DC motor including a moving element and three-phase drive windings, the brushless DC motor being sine-wave driven by the integrated circuit device.

16. A motor device comprising:
a motor;
a speed detector for detecting a speed of a moving element of the motor;
the motor driving device of claim 1;
a power input terminal for receiving DC power; and
a command information input terminal for receiving command information.

17. The motor device of claim 16, wherein
the motor is a brushless DC motor including a moving element and three-phase drive windings, the brushless DC motor being sine-wave driven by the motor driving device.

* * * * *